US011669566B2

United States Patent
Motiian et al.

(10) Patent No.: US 11,669,566 B2
(45) Date of Patent: *Jun. 6, 2023

(54) MULTI-RESOLUTION COLOR-BASED IMAGE SEARCH

(71) Applicant: Adobe Inc., San Jose, CA (US)

(72) Inventors: Saeid Motiian, San Francisco, CA (US); Zhe Lin, Fremont, CA (US); Samarth Gulati, Chandigarh (IN); Pramod Srinivasan, San Francisco, CA (US); Jose Ignacio Echevarria Vallespi, San Jose, CA (US); Baldo Antonio Faieta, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/565,816

(22) Filed: Dec. 30, 2021

(65) Prior Publication Data
US 2022/0121705 A1    Apr. 21, 2022

Related U.S. Application Data

(63) Continuation of application No. 16/561,973, filed on Sep. 5, 2019, now Pat. No. 11,216,505.

(51) Int. Cl.
*G06F 16/00*   (2019.01)
*G06F 16/583*  (2019.01)
(Continued)

(52) U.S. Cl.
CPC ........ *G06F 16/5838* (2019.01); *G06F 16/532* (2019.01); *G06F 16/55* (2019.01);
(Continued)

(58) Field of Classification Search
CPC .... G06F 16/5838; G06F 16/532; G06F 16/55; G06F 17/16; G06K 9/622; G06V 10/56; G06V 10/758; G06V 10/763
See application file for complete search history.

(56) References Cited

U.S. PATENT DOCUMENTS 5,579,471 A * 11/1996 Barber ............... G06F 16/5862
707/E17.025
6,411,953 B1 * 6/2002 Ganapathy ............ G06K 9/626
707/E17.025
(Continued)

FOREIGN PATENT DOCUMENTS

CN    111062865 A    4/2020

OTHER PUBLICATIONS

Li Wu, "Multi-resolution of Image Retrieval in Image Databases System", IEEE, pp. 243-246 (Year: 2010).*
(Continued)

*Primary Examiner* — Jared M Bibbee
(74) *Attorney, Agent, or Firm* — FIG. 1 Patents

(57) ABSTRACT

In implementations of multi-resolution color-based image search, an image search system determines a color vector for a query image based on a color histogram of the query image by concatenating two color histograms having different resolutions. The image search system can compute distance measures between the color vector of the query image and color vectors of candidate images. The image search system can select one or more of the candidate images to return based on the distance measures utilizing the distance measures as indication of color similarity of the candidate images to the query image.

20 Claims, 10 Drawing Sheets
(5 of 10 Drawing Sheet(s) Filed in Color)

(51) Int. Cl.
  *G06F 17/16* (2006.01)
  *G06F 16/55* (2019.01)
  *G06F 16/532* (2019.01)
  *G06V 10/56* (2022.01)
  *G06V 10/75* (2022.01)
  *G06V 10/762* (2022.01)

(52) U.S. Cl.
  CPC .............. *G06F 17/16* (2013.01); *G06V 10/56* (2022.01); *G06V 10/758* (2022.01); *G06V 10/763* (2022.01)

(56) References Cited

U.S. PATENT DOCUMENTS

| | | | | |
|---|---|---|---|---|
| 6,430,312 | B1* | 8/2002 | Huang | G06T 7/90 |
| | | | | 707/E17.026 |
| 6,621,926 | B1* | 9/2003 | Yoon | G06F 16/5838 |
| | | | | 382/168 |
| 6,801,657 | B1* | 10/2004 | Cieplinski | G06V 10/56 |
| | | | | 382/209 |
| 7,236,652 | B2* | 6/2007 | Kasutani | G06F 16/583 |
| | | | | 707/E17.02 |
| 11,216,505 | B2 | 1/2022 | Motiian et al. | |
| 2002/0122587 | A1* | 9/2002 | Lim | G06F 16/5862 |
| | | | | 707/E17.025 |
| 2003/0128298 | A1* | 7/2003 | Moon | G06T 7/246 |
| | | | | 348/700 |
| 2005/0084154 | A1* | 4/2005 | Li | G06V 10/56 |
| | | | | 348/231.2 |
| 2005/0093880 | A1* | 5/2005 | Kim | G06F 16/785 |
| | | | | 345/589 |
| 2006/0050993 | A1* | 3/2006 | Stentiford | G06F 16/58 |
| | | | | 707/E17.023 |
| 2008/0240561 | A1 | 10/2008 | Kuwahara | |
| 2009/0304229 | A1* | 12/2009 | Hampapur | G06V 10/28 |
| | | | | 382/103 |
| 2010/0104207 | A1* | 4/2010 | Chan | G06T 9/00 |
| | | | | 382/253 |
| 2010/0226532 | A1* | 9/2010 | Hayasaka | G06V 10/7515 |
| | | | | 382/103 |
| 2010/0316290 | A1* | 12/2010 | Jia | G06K 9/6282 |
| | | | | 382/165 |
| 2011/0029561 | A1* | 2/2011 | Slaney | G06F 16/583 |
| | | | | 707/E17.014 |
| 2011/0200251 | A1* | 8/2011 | Chin | G06V 10/50 |
| | | | | 382/168 |
| 2012/0170838 | A1* | 7/2012 | Wang | G06V 20/52 |
| | | | | 382/165 |
| 2012/0224787 | A1* | 9/2012 | Imai | H04N 5/2352 |
| | | | | 382/274 |
| 2014/0254927 | A1* | 9/2014 | Bhardwaj | G06F 16/532 |
| | | | | 382/165 |
| 2015/0049943 | A1* | 2/2015 | Hamsici | G06V 10/454 |
| | | | | 382/218 |
| 2015/0324394 | A1* | 11/2015 | Becker | G06F 16/5838 |
| | | | | 707/733 |
| 2015/0324662 | A1* | 11/2015 | Garg | G06V 10/469 |
| | | | | 382/165 |
| 2016/0048536 | A1* | 2/2016 | Di | G06V 10/751 |
| | | | | 382/165 |
| 2017/0161919 | A1* | 6/2017 | Schroeder | G06T 7/74 |
| 2019/0278844 | A1 | 9/2019 | Brixey et al. | |
| 2020/0160042 | A1 | 5/2020 | Bui et al. | |
| 2022/0130078 | A1 | 4/2022 | Maheshwari et al. | |

OTHER PUBLICATIONS

Randall, "Color Survey Results", xkcd, 2010, [retrieved on Nov. 24, 2020], Retrieved from the Internet: <URL:blog.xkcd.com/2010/05/03/color-survey-results/>., May 3, 2010, 20 pages.
"Colorize Image on Pinetools [online]", Pinetools, 2020, [retrieved on Nov. 24, 2020], Retrieved from the Internet: <URL:https://pinetools.com/colorize-image>., 2020, 2 pages.
"Colorize Images [online]", Manytools [retrieved Dec. 22, 2020]. Retrieved from the Internet: <https://manytools.org/image/colorize-filter/>., 2020, 3 pages.
"Colorize Photos options on Algorithmia [online]", Algorithmia [retrieved on Nov. 24, 2020], Retrieved from the Internet: <URL:https://demos.algorithmia.com/colorize-photos>., 2020, 4 pages.
"Image Colorizer [online]", Image Colorizer [retrieved on Dec. 22, 2020], Retrieved from the Internet: <URL:https://imagecolorizer.com/>., 2020, 4 pages.
"Non-Final Office Action", U.S. Appl. No. 16/561,973, dated Jun. 1, 2021, 14 pages.
"Notice of Allowance", U.S. Appl. No. 16/561,973, dated Aug. 30, 2021, 8 pages.
"U.S. Appl. No. 16/561,973", filed Sep. 5, 2019, Sep. 5, 2019, 70 pages.
Bahng, Hyojin, et al., "Coloring with Words: Guiding Image Colorization Through Text-based Palette Generation", University of California, Berkeley, 2018, [retrieved on Nov. 24, 2020], Retrieved from the Internet: <URL:https://arxiv.org/pdf/1804.04128.pdf>., Aug. 7, 2018, 25 pages.
Berlin, Brent, et al., "Basic color terms: Their universality and evolution", California Univ., Berkeley, Lang.-Behav. Res. Lab, [retrieved on Nov. 24, 2020], Retrieved from the Internet: <URL:https://files.eric.ed.gov/fulltext/ED019655.pdf>, Mar. 15, 1999, 80 pages.
Chang, Huiwen, et al., "Palette-based Photo Recoloring", Princeton University, 2015, [retrieved on Nov. 24, 2020], Retrieved from the Internet: <URL:https://gfx.cs.princeton.edu/pubs/Chang_2015_PPR/chang2015-palette_small.pdf>., Jul. 27, 2015, 11 pages.
Chen, Yanbei, et al., "Image Search with Text Feedback by Visiolinguistic Attention Learning", Queen Mary University of London, 2020, [retrieved on Nov. 24, 2020], Retrieved from the Internet: <URL:http://www.eecs.qmul.ac.uk/~sgg/papers/ChenEtAl_CVPR2020.pdf>., Jun. 2020, 11 pages.
He, Kaiming, et al., "Deep Residual Learning for Image Recognition", Proceedings of the IEEE conference on computer vision and pattern recognition, 2016 [retrieved Feb. 18, 2022], Retrieved from the Internet: <https://openaccess.thecvf.com/content_cvpr_2016/papers/He_Deep_Residual_Learning_CVPR_2016_paper.pdf>., Jun. 2016, 12 pages.
Jegou, Herve, et al., "Product Quantization for Nearest Neighbor Search", Mar. 2010, 14 pages.
Jeong, Sangoh, et al., "Image retrieval using color histograms generated by Gauss mixture vector quantization", Computer Vision and Image Understanding, vol. 94, No. 1-3 [retrieved Jun. 3, 2021]. Retrieved from the Internet <https://doi.org/10.1016/j.cviu.2003.10.015>., Oct. 15, 2003, 23 pages.
Jetley, Saumya, et al., "Learn to Pay Attention", International Conference on Learning Representations, 2018, [retrieved on Nov. 24, 2020], Retrieved from the Internet: <URL:https://arxiv.org/pdf/1804.02391.pdf>., Apr. 26, 2018, 14 pages.
Liu, Ziwei, et al., "DeepFashion: Powering Robust Clothes Recognition and Retrieval with Rich Annotations", Proceedings of the IEEE Conference on Computer Vision and Pattern Recognition (CVPR) [retrieved on Nov. 24, 2020], Retrieved from the Internet: <URL:https://openaccess.thecvf.com/content_cvpr_2016/papers/Liu_DeepFashion_Powering_Robust_CVPR_2016_paper.pdf>., Jun. 2016, 9 pages.
Mao, Xudong, et al., "Least Squares Generative Adversarial Networks", IEEE Transactions on Pattern Analysis and Machine Intelligence, vol. 41, No. 12, [retrieved on Dec. 10, 2020], Retrieved from the Internet <https://arxiv.org/pdf/1611.04076.pdf>, Apr. 5, 2017, 16 pages.
Michel, Jean-Baptiste, et al., "Quantitative Analysis of Culture Using Millions of Digitized Books", Science, 2011, [retrieved on Nov. 24, 2020], Retrieved from the Internet: <URL:https://dash.harvard.edu/bitstream/handle/1/8899722/MichelScience2011.pdf?sequence=1&isAllowed=y>., Jan. 14, 2011, 15 pages.
Misra, Ishan, et al., "From Red Wine to Red Tomato: Composition with Context", The Robotics Institute, 2017, [retrieved on Nov. 24,

(56) References Cited

OTHER PUBLICATIONS

2020], Retrieved from the Internet: <URL:https://www.ri.cmu.edu/wp-content/uploads/2017/12/composing_cvpr17.pdf>, Jul. 2017, 10 pages.

Pennington, Jeffrey, et al., "GloVe: Global Vectors for Word Representation", Proceedings of the 2014 Conference on Empirical Methods in Natural Language Processing (EMNLP) [retrieved on Sep. 17, 2021], Retrieved from the Internet: <https://www.aclweb.org/anthology/D14-1162.pdf>., Sep. 2014, 12 pages.

Svadja, Hep, "Color Your Spring with Adobe Color Gradients", Creative Inspiration & Trends, 2020, [retrieved on Nov. 24, 2020], Retrieved from the Internet: <URL:theblog.adobe.com/color-your-spring-with-adobe-color-gradients/>., Apr. 27, 2020, 9 pages.

Vedaldi, Andrea, et al., "Efficient Additive Kernels via Explicit Feature Maps", Dept. of Engineering Science, University of Oxford, UK, 2012, [retrieved on Nov. 24, 2020], Retrieved from the Internet: <URL:https://www.robots.ox.ac.uk/~vgg/publications/2010/Vedaldi10/vedaldi10.pdf>., Jun. 2011, 8 pages.

Vo, Nam, et al., "Composing Text and Image for Image Retrieval—An Empirical Odyssey", IEEE [retrieved on Nov. 24, 2020], Retrieved from the Internet: <URL:https://arxiv.org/pdf/1812.07119.pdf>., Dec. 18, 2018, 9 pages.

Wang, Xin, et al., "Task-Aware Feature Generation for Zero-Shot Compositional Learning", UC Berkeley [retrieved on Nov. 24, 2020], Retrieved from the Internet: <URL:https://arxiv.org/pdf/1906.04854.pdf>., Mar. 23, 2020, 17 pages.

Wei, Kun, et al., "Adversarial Fine-Grained Composition Learning for Unseen Attribute-Object Recognition", ICCV, 2019, [retrieved on Nov. 24, 2020], Retrieved from the Internet: <URL:https://openaccess.thecvf.com/content_ICCV_2019/papers/Wei_Adversarial_Fine-Grained_Composition_Learning_for_Unseen_Attribute-Object_Recognition_ICCV_2019_paper.pdf>., Nov. 2019, 9 pages.

Xian, Wenqi, et al., "TextureGAN: Controlling Deep Image Synthesis with Texture Patches", Georgia Institute of Technology, 2018, [retrieved on Nov. 24, 2020], Retrieved from the Internet: <URL:https://arxiv.org/pdf/1706.02823.pdf>., Apr. 14, 2018, 10 pages.

Yu, Aron, et al., "Fine-Grained Visual Comparisons with Local Learning", University of Texas at Austin, 2014, [retrieved on Nov. 24, 2020], Retrieved from the Internet: <URL:https://www.cs.utexas.edu/~grauman/papers/yu-cvpr2014.pdf>., Jun. 2014, 8 pages.

Zhang, Richard, et al., "Colorful Image Colorization", University of California, Berkeley, 2016, [retrieved on Nov. 24, 2020], Retrieved from the Internet: <URL:https://arxiv.org/pdf/1603.08511.pdf>., Oct. 5, 2016, 29 pages.

Zhu, Jun-Yan, et al., "Generative Visual Manipulation on the Natural Image Manifold", University of California, Berkeley, 2018, [retrieved on Jan. 21, 2022], Retrieved from the Internet: <URL:https://arxiv.org/pdf/1609.03552.pdf>., Dec. 16, 2018, 16 pages.

"Foreign Office Action", GB Application No. 2112183.5, dated Feb. 2, 2022, 7 pages.

U.S. Appl. No. 17/079,844, "Restriction Requirement", U.S. Appl. No. 17/079,844, dated Jan. 10, 2023, 6 pages.

2214904.1 , "Combined Search and Examination Report", GB Application No. 2214904.1, dated Nov. 2, 2022, 4 pages.

\* cited by examiner

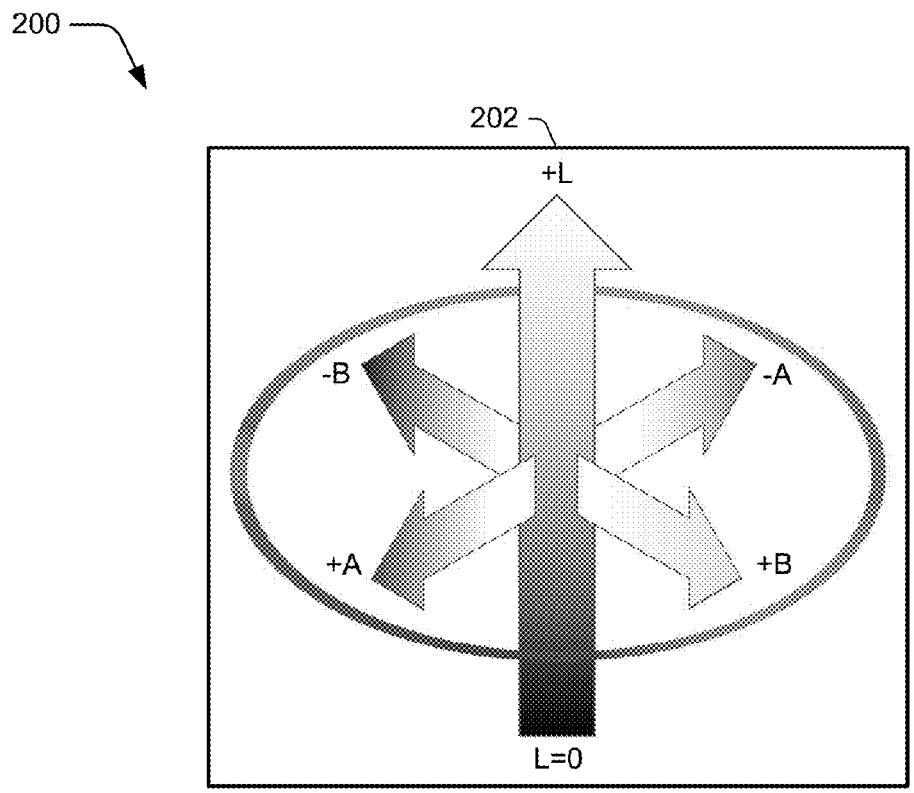
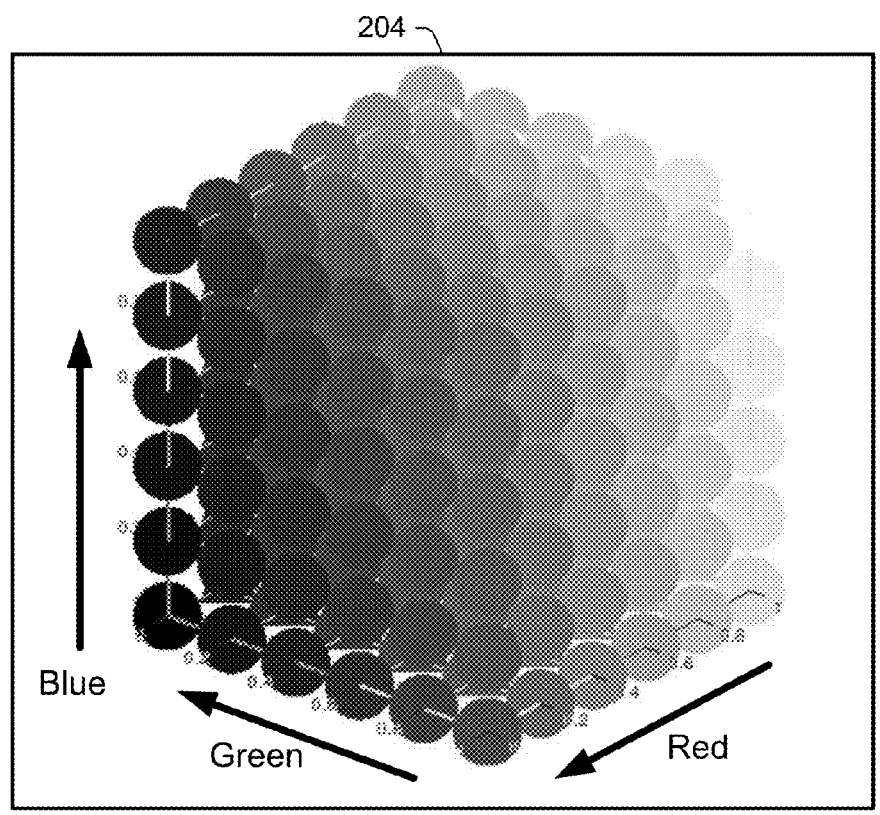
FIG. 2

700

```
┌─────────────────────────────────────────────────────────┐
│  Determine a first color histogram of a query image,    │
│  the first color histogram having a first resolution    │
│                          702                            │
└─────────────────────────────────────────────────────────┘
                              │
                              ▼
┌─────────────────────────────────────────────────────────┐
│  Determine a second color histogram of the query image, │
│  the second color histogram having a second resolution  │
│  different than the first resolution                    │
│                          704                            │
└─────────────────────────────────────────────────────────┘
                              │
                              ▼
┌─────────────────────────────────────────────────────────┐
│  Generate a color vector of the query image by          │
│  concatenating the first color histogram and the        │
│  second color histogram                                 │
│                          706                            │
└─────────────────────────────────────────────────────────┘
                              │
                              ▼
┌─────────────────────────────────────────────────────────┐
│  Select one or more images from a plurality of images   │
│  based on distance measures between the color vector    │
│  of the query image and color vectors of the plurality  │
│  of images, the selecting utilizing the distance        │
│  measures as indication of color similarity of the      │
│  one or more images to the query image                  │
│                          708                            │
└─────────────────────────────────────────────────────────┘
```

Determine a first color histogram and a second color histogram of a query image, the first color histogram having a first resolution and the second color histogram having a second resolution different than the first resolution
802

Generate a multi-resolution color histogram of the query image by concatenating the first color histogram and the second color histogram
804

Generate a color vector of the query image by taking square roots of values of the multi-resolution color histogram
806

Compress the color vector to form a compressed color vector having a length less than a length of the color vector
808

Generate distance measures between the compressed color vector of the query image and color vectors of a plurality of images
810

Select one or more images from the plurality of images based on the distance measures that indicate color similarity of the one or more images to the query image
812

FIG. 8

MULTI-RESOLUTION COLOR-BASED IMAGE SEARCH

RELATED APPLICATION

This application is a continuation of and claims priority to U.S. patent application Ser. No. 16/561,973 filed Sep. 5, 2019 entitled "Multi-Resolution Color-Based Image Search," the disclosure of which is incorporated by reference herein in its entirety.

BACKGROUND

Users often search for images, such as images in a stock database, that are similar to a query image. For instance, a user may use an image search system to perform a color-based image search that returns images from a stock database having similar colors as the query image. Color-based image searches may be performed for various reasons, such as to obtain images that fit a color theme, design or branding guidelines, etc., in which the images returned by the image search system are to include the colors of the query image in similar proportions as the query image without introducing colors that are not included in the query image.

Image search systems may determine images that have colors that are similar to a query image in different ways. For instance, the image search systems may allow a user to search for images using user-specified colors, such as by specifying red, green, and blue (RGB) values, or Hex values. However, perception of colors varies between observers, and thus the results obtained are unreliable. In some cases, the image search systems extract the most relevant colors of the query image and search for images using the relevant colors. However, these image search systems lack the level of precision needed to find images that match the color distribution of most query images, such as images that contain all the colors of a query image, including colors that, despite appearing only in small regions of the query image, are salient to a human observer. Moreover, these image search systems may return images that introduce new colors that are not present in the query image.

In some cases, the image search systems recolor images to match a query image. Though these systems may accurately change the colors of images to match the colors of the query image, they require large amounts of computational resources and incur significant processing delays, so that they are not practical when searching large numbers of images (e.g., thousands of images) and when a user desires results of the image search quickly (e.g., within several seconds). Accordingly, conventional image search systems are inefficient because they require large computational resources and have significant processing delays, and/or the convention image search systems are inaccurate because they do not capture the color distribution of the query image with enough detail or precision.

SUMMARY

Techniques and systems are described for multi-resolution color-based image searches. An image search system is implemented to receive a query image, such as an input image selected by a user of a computing device, and the image search system can then determine a color vector for the query image based on a multi-resolution color histogram of the query image. The image search system can determine a first color histogram and a second color histogram of the query image, each having different resolutions. For instance, the image search system can determine the first color histogram and the second color histogram as respective three-dimensional (3D) histograms with different numbers of bins from one another in a 3D color space, such as a LAB color space. The image search system can concatenate the contents of the first color histogram and the second color histogram to generate a multi-resolution histogram, and then apply a mapping to the multi-resolution histogram to generate a color vector. The mapping may include taking the square roots of values of the multi-resolution histogram to add more weight to colors that sparsely occur in the query image. In one example, the image search system includes an encoder to compress the color vector, such as by reducing a length of the color vector to reduce storage and computational requirements for the color vector.

To determine images that have a similar color distribution as the query image, the image search system can compute distance measures between the color vector of the query image and color vectors of candidate images, such as stock images in a database that stores color vectors together with the stock images. The distance measures can include an L2-norm between color vectors. The image search system can select to return one or more of the candidate images that have a similar color distribution as the query image based on the distance measures, such as by selecting a number of the candidate images (e.g., ten images) corresponding to the lowest distance measures.

Accordingly, the image search system is efficient, as it can be implemented with deterministic rather than stochastic methods. For instance, the image search system can compute simple L2-norms between color vectors to determine images that match a query image. Hence, the image search system is suitable for color-based image searches of large numbers of images in which images are to be quickly found that accurately include the colors of a query image without introducing colors that are not found in the query image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 illustrates example color spaces in accordance with one or more aspects of the disclosure.

FIG. 7 illustrates a flow diagram depicting an example procedure in accordance with one or more aspects of the disclosure.

FIG. 8 illustrates a flow diagram depicting an example procedure in accordance with one or more aspects of the disclosure.

DETAILED DESCRIPTION

Overview

Figure 1:
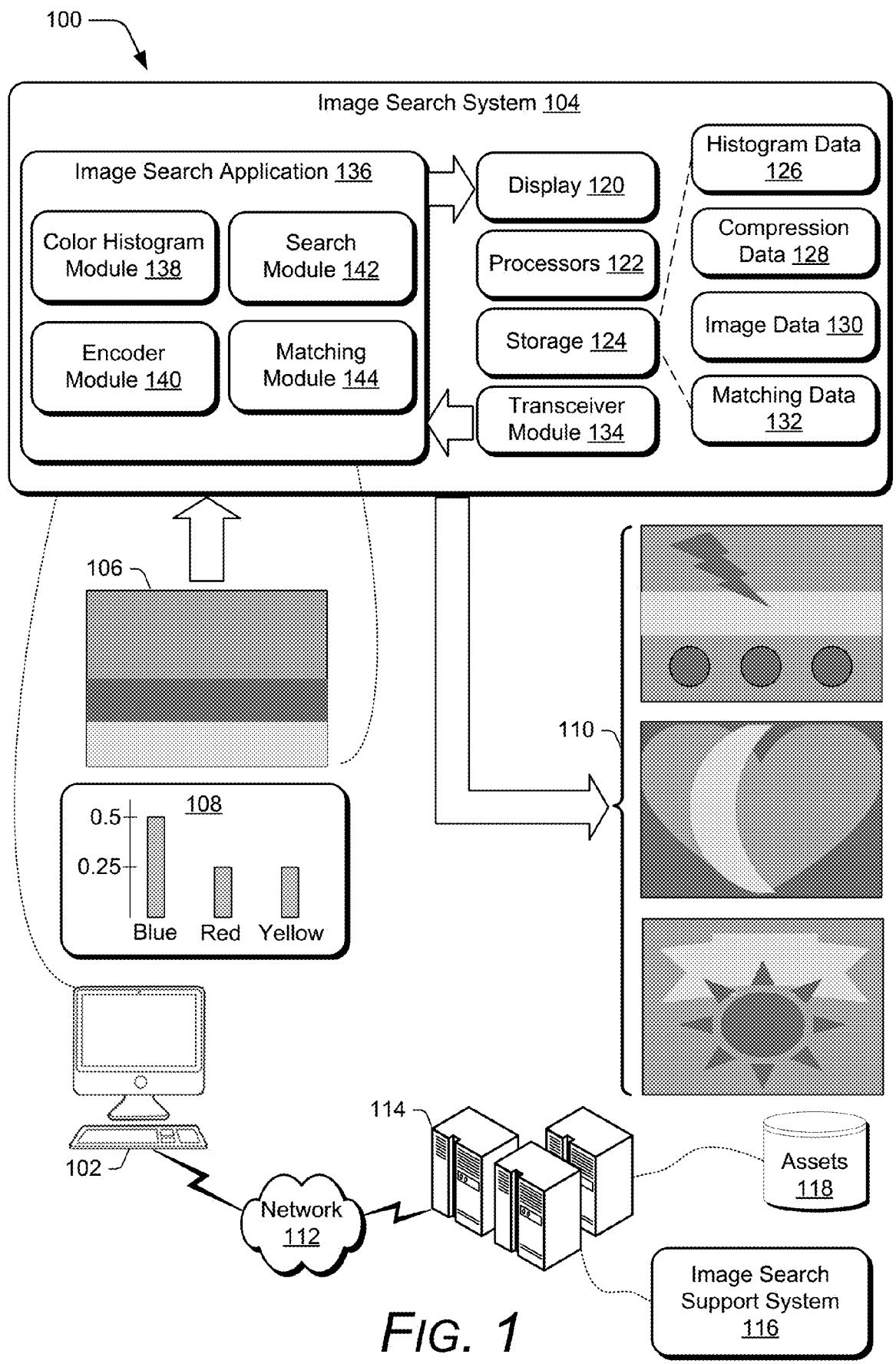
FIG. 1 illustrates a digital medium environment in an example implementation that is operable to employ techniques described herein.

Color-based image searches aim to find images that have color distributions that are similar to a color distribution of a query image, and are performed for various reasons, such as to obtain images that fit a color theme, design, branding guideline, etc. To match the color distribution of a query image, it may be desirable to return images from a color-based image search that include all the colors of a query image, since colors that, despite appearing only in small regions of the query image, remain salient to a human observer. Moreover, the images returned from the color-based image search should not introduce new colors that are not present in the query image.

Generally, conventional image search systems that perform color-based image searches can be inefficient because they often require large computational resources and introduce significant processing delays, such as image search systems that recolor images to match a query image. Hence, these conventional image search systems are simply not practical for color-based image searches of large numbers of images, such as thousands of images, in which an image is to be quickly found (e.g., in just a few seconds), since the processing delays introduced by these conventional image search systems can be prohibitive—much greater than just a few seconds.

Moreover, conventional image search systems may be inaccurate, since they do not capture the color distribution of the query image with enough detail or precision, such as image search systems that allow a user to search for images using user-specified colors, or image search systems that extract the most relevant colors of a query image and search for images using the relevant colors. Hence, these conventional image search systems may return images that are not acceptable. For instance, because of the lack of precision of these conventional image search systems, they may not be able to return images from a search that contain all the colors of a query image, including colors that, despite appearing only in small regions of the query image, are salient to a human observer. Worse, in some cases these conventional image search systems may return images that introduce new colors that are not present in the query image.

Furthermore, most conventional image search systems rely on stochastic methods that require large training data sets. These training data sets may be expensive to obtain, and training a model (e.g., a neural network) with the training data sets may require significant computational resources over long time periods. Moreover, many of these stochastic methods may be sensitive to the type of objects in an image, and may work well for one class of objects, but poorly for other classes of objects. For instance, conventional image search systems may be able to accurately match color distributions for images of automobiles if they were trained using images of automobiles, but not for images of people if images of people were not used to train the conventional image search systems.

Therefore, conventional image search systems may produce poor results that are not usable. Moreover, conventional image search systems may produce these poor results with enough processing delay that prohibits the use of the conventional image search systems for image searches expected to have low latency.

Accordingly, this disclosure describes systems, devices, and techniques for color-based image searches of large numbers of images in which images are to be quickly found that accurately include the colors of a query image without introducing colors that are not found in the query image. An image search system can determine a color vector for a query image based on a multi-resolution color histogram of the query image. The image search system can determine the multi-resolution color histogram by concatenating two histograms having different resolutions (e.g., numbers of bins). In one example, the image search system determines a first color histogram and a second color histogram as respective 3D histograms with different numbers of bins from one another in a LAB color space. For instance, the first color histogram can include different numbers of bins in each of the dimensions of the LAB color space, such as nine bins in the L dimension, seven bins in the A dimension, and eight bins in the B dimension, and the second color histogram can include a same number of bins in each of the dimensions of the LAB color space that is different than the numbers of bins of the first color histogram, such as ten bins in each of the L dimension, the A dimension, and the B dimension. To generate a multi-resolution color histogram that represents the color distribution of the query image, the image search system can concatenate the contents of the first color histogram and the second color histogram.

To prevent colors that are prevalent in the query image from dominating colors that are sparse in the query image, the image search system can be implemented to restrict the color histograms of the query image by applying a mapping to the multi-resolution color histogram. By applying a mapping to the multi-resolution color histogram, the image search system can generate a color vector of the query image. In one example, the image search system takes the square root of values of the multi-resolution color histogram of the query image to generate a color vector of the query image in which more weight is given to colors that sparsely occur in the query image. By applying the mapping that includes a square root function, the dimensionality of the color vector does not increase, unlike other mappings.

Additionally or alternatively, the image search system can include an encoder to compress the color vector, such as by reducing a length of the color vector to reduce storage and computational requirements for the color vector. The encoder can split the color vector into a plurality of vectors in a subspace. For instance, the encoder can receive a color vector of a length and then zero pad the color vector so that the length including the padded zeros is divisible by the size of the subspace and the number of vectors. As an example, the encoder can pad a length—1504 color vector with 32 zeros to a length of 1536 for a subspace of dimension 24 having 64 vectors, since 1536 is divisible by 64 and 24. Hence, the encoder can split the color vector into 64 length—24 vectors.

The encoder can also divide the subspace into a plurality of clusters, such as 256 clusters, so that each cluster can be represented by a byte. To compress the color vector, the encoder can assign each vector to a respective one of the clusters in the subspace, and denote each vector with a respective identifier of the respective one of the clusters. The encoder may then concatenate the respective identifiers for the vectors to form a compressed color vector. In one example, the compressed color vector is denoted by 64 bytes.

To determine images that have a similar color distribution as the query image, the image search system can be implemented to compute distance measures between the color vector of the query image and color vectors of candidate images to search, such as stock images in a database. In one example, the database includes stock images and color vectors of the stock images. The image search system can obtain the color vectors of the stock images and determine distance measures as L2-norms between the color vector of the query image and color vectors of the stock images. The distance measures can indicate color similarity of candidate images (e.g., the stock images) to the query image.

The image search system can select one or more candidate images to return that have a similar color distribution as the query image based on the distance measures, such as by selecting a number of the candidate images (e.g., ten images) corresponding to the lowest distance measures. Hence, the image search system can rank the candidate images searched (e.g., stock images of a database) based on the distance measures, and select a number of the candidate images according to the ranking to be output as having a similar color distribution as the query image. In one example, the image search system requires that the distance measure between color vectors of a candidate image and a query image be less than a distance threshold in order for the candidate image to be output by the image search system as having a similar color distribution as the query image.

The image search system provides for numerous improvements over conventional image search systems. Since the image search system can determine a color vector for a query image based on a multi-resolution color histogram of the query image, the image search system captures the color distribution of the query image at a high level of detail. By applying a square root mapping that preserves less prevalent colors, the image search system can prevent dominant colors of the query image from dominating the less prevalent colors. Accordingly, the image search system can retrieve images from an image search that match the color distribution of the query image, e.g., images that include the colors of the query image in similar proportions as the query image without introducing colors that are not included in the query image, when conventional image search systems fail to do so. Therefore, the image search system can be used in applications that require strict color matching, like selecting images that must adhere to a branding scheme, when conventional image search systems cannot be used.

Not only does the image search system produce better results than conventional image search systems (e.g., images that better match the color distribution of a query image), the image search system is also more efficient than conventional image search systems, since the image search system can be implemented with deterministic methods. For instance, the image search system can determine images in a color-based image search by computing L2-norms between color vectors of images. Hence, the image search system can be used in applications that require low processing delay, such as returning matching images from a search of thousands of images within a few seconds, when conventional image search systems cannot be used because of the latency they introduce. Accordingly, image search system is efficient and suitable for color-based image searches of large numbers of images in which images are to be quickly found that accurately include the colors of a query image without introducing colors that are not found in the query image.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes computing device 102 depicted as a desktop computer. A desktop computer is one example of computing device 102, which can generally include any suitable type of computing device, such as a mobile phone, tablet, laptop computer, desktop computer, gaming device, goggles, glasses, camera, digital assistant, echo device, image editor, non-linear editor, digital audio workstation, copier, scanner, client computing device, and the like. Hence, computing device 102 may range from full resource devices with substantial memory and processor resources (e.g., personal computers, game consoles, etc.) to a low-resource device with limited memory or processing resources (e.g., mobile devices).

Notably, computing device 102 can include any suitable number of computing devices, such as one or more computing devices, (e.g., a smart phone connected to a tablet). Furthermore, discussion of one computing device of computing device 102 is not limited to that one computing device, but generally applies to each of the computing devices included in computing device 102. Furthermore, computing device 102 may be representative of one or a plurality of different devices connected to a network that perform operations "over the cloud" as further described in relation to FIG. 10. In one example, computing device 102 includes multiple computing devices communicatively coupled to each other, such as with a low power wireless communication standard (e.g., a Bluetooth® protocol). Hence, an asset (e.g., digital image, video, text, drawing, artwork, document, file, and the like) generated, processed, edited, or stored on one device of computing device 102 (e.g., a desktop computer) can be communicated to, and displayed on and processed by another device of computing device 102 (e.g., a tablet).

Various types of input devices and input instrumentalities can be used to provide input to computing device 102. For example, computing device 102 can recognize input as being a mouse input, drawing-tool input, stylus input, touch input, input provided through a natural user interface, and the like. Thus, computing device 102 can recognize multiple types of gestures including touch gestures and gestures provided through a natural user interface. In one example, computing device 102 includes speech recognition, identification, and synthesis functionalities, microphones, and speakers that allow computing device 102 to communicate with a user in a conversation, e.g., a user conversation.

Computing device 102 can include image search system 104 to perform multi-resolution color-based image searches. In the example in FIG. 1, image search system 104 receives query image 106. For instance, query image 106 can be a user-supplied image for a color-based search. In response to receiving query image 106, image search system 104 can compute histogram 108 of the query image 106. For simplicity, query image 106 is represented in one dimension (i.e., color name) Generally, however, image search system 104 can compute a color histogram in any suitable number of dimensions, such as a 3D histogram in which colors are represented by three values in a color space, such as a LAB color space. Also for simplicity, query image 106 includes only three colors, blue, red, and yellow. Since the query image 106 includes red and yellow in equal amounts, and blue in an amount twice that of red and yellow, histogram 108 includes a value of 0.5 for blue and values of 0.25 for red and yellow, indicating that the query image 106 is made up of 50% blue, 25% red, and 25% yellow. In one example, image search system 104 applies a mapping to histogram 108 by taking the square root of the values in the histogram 108, resulting in a color vector of the query image 106 having a value of $1/\sqrt{2}$ (~0.7071) for blue and values of 0.5 for red and yellow (not shown in FIG. 1 for clarity).

Using the histogram 108 of the query image 106, the image search system 104 can return output images 110 having color distributions similar to the color distribution of the query image 106. For instance, image search system 104 can obtain the output images 110 and color vectors of the output images 110 from a database of images, and determine distance measures between a color vector of the query image 106 and the color vectors of the output images 110. A color vector of the query image 106 can be determined from the histogram 108, such as the vector [0.7071 0.5 0.5] representing the square root of the values [0.5 0.25 0.25] of the histogram 108. The color vectors of the output images 110 can be determined from histograms of the output images 110 (not shown for clarity) and stored in a database together with the output images 110. The image search system 104 can return the output images 110 based on the distance measures between the color vector of the query image 106 and the color vectors of the output images 110 being less than a distance threshold. Accordingly, the colors in the output images 110 match the colors of the query image 106 and are in similar proportion to the colors of the query image 106. Moreover, the output images 110 do not include colors that are not included in the query image 106. Hence, the output images 110 are useful for applications in which candidate images are to be found that conform to a branding guideline or color theme, such as to match the colors of a flag.

In one example, the image search system 104 determines the output images 110 for the query image 106 based on the color distribution of the query image 106 without regard to the content of the query image 106. For instance, the image search system 104 can determine the output images 110 not based on the shapes in the output images 110 (e.g., stars, hearts, banners, etc.), but rather based on the colors making up the shapes in the output images 110. Hence, the image search system 104 can be provided a query image that includes a car, and return output images unrelated to cars, such as including persons, fruit, a sweater, etc., that match the color of the car in the query image.

Computing device 102 can also be coupled to network 112, which communicatively couples computing device 102 with server 114. Network 112 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 114 may include one or more servers or service providers that provide services, resources, assets, or combinations thereof to computing device 102. Services, resources, or assets may be made available from server 114 to image search system 104, image search support system 116, or combinations thereof, and stored at assets 118 of server 114. For instance, digital images stored at assets 118 can be made available to computing device 102. Hence, output images 110 can include any suitable asset stored at assets 118 of server 114.

Server 114 may include image search support system 116 configurable to receive signals from computing device 102, process the received signals, and send the processed signals to computing device 102 to support color-based image search. For instance, computing device 102 may obtain any suitable representation of a query image (e.g., histogram 108 of query image 106) and communicate it along with any suitable data to server 114. Server 114, using image search support system 116, may determine a ranked list of candidate images based on distance measures between a color vector of a query image and color vectors of candidate images stored at assets 118. Server 114 may then send the ranked list of candidate images to computing device 102, which can select a number of the candidate images to output to a user from the ranked list from server 114, such as by selecting a highest ranking image or images from the list. Accordingly, image search support system 116 of server 114 can include a copy of image search system 104.

In some embodiments, computing device 102 includes image search system 104 for multi-resolution color-based image search. Image search system 104 can include a display 120, which can expose any suitable data used by or associated with image search system 104. In one example, display 120 displays a user interface for exposing images, such as the query image 106 and output images 110. Display 120 can expose a user interface configurable to receive a query image, and display output images determined by the image search system 104. In one example, the user interface exposed on display 120 can display representations of color histograms of images, such as histogram 108 of query image 106. Display 120 can include any suitable type of display, such as a touchscreen, liquid crystal display, plasma display, head-mounted display, projector and screen, and the like.

Image search system 104 may include processors 122. Processors 122 can include any suitable type of processor, such as a graphics processing unit, central processing unit, digital signal processor, processor core, combinations thereof, and the like. Hence, image search system 104 may be implemented at least partially by executing instructions stored in storage 124 on processors 122. For instance, processors 122 may execute portions of image search application 136 (discussed below in more detail).

Image search system 104 also may include storage 124, which can be any suitable type of storage accessible by or contained in image search system 104. Storage 124 stores data and provides access to and from memory included in storage 124 for any suitable type of data. For instance, storage 124 can include histogram data 126 including data related to color histograms, such as resolutions of histograms (e.g., numbers of bins of 3D histograms in a LAB color space), multi-resolution color histograms of an image formed by concatenating color histograms having different resolutions, color vectors of an image formed by applying a mapping (e.g., a square root function) to a multi-resolution color histogram, and a length of a color vector. Histogram data 126 can also include an indicator of a mapping applied to a color vector or color histogram, such as an indicator of a square root function. For instance, a value of zero of a mapping indicator may indicate that a color histogram is raw (e.g., no mapping has been applied to it), and a value of one may indicate that a square root function has been applied to a color histogram or color vector.

Storage 124 may also include compression data 128 including data related to compressing a color vector, such as a length of a color vector, a dimension of a subspace used to divide the color vector, a number of zeros padded to a color, and vectors formed by splitting a color vector into a plurality of vectors in a subspace. Compression data 128 can also include clusters of a subspace, identifiers of the clusters (e.g., byte numbers), and a compressed color vector, such as a color vector formed by concatenating identifiers of clusters (e.g., cluster identification numbers).

Storage 124 may also include image data 130 including data related to images of a multi-resolution color-based image search, such as data (e.g., pixel values, curves representing vector graphics, etc.) of a query image (e.g., query image 106) and data of output images (e.g., output images 110). Image data 130 can also include a size of an image, such as a number of pixels, a source of an image (e.g., an identifier of a database from which an image is obtained), an indicator of a type of image (e.g., a first value may indicate a rasterized image and a second value may indicate an image represented by vector graphics), and the like. Image data 130 can also include metadata of an image, such as a data an image was captured, camera settings used to capture an image (e.g., aperture, shutter speed, light or sensor sensitivity setting, etc.), a name of a photographer who captured an image, an indicator of a type of camera or capture device used to capture an image, a location where an image was captured (e.g., coordinates such as longitude and latitude), and the like.

Storage 124 may include matching data 132 including data related to selecting images having color distributions similar to a color distribution of a query image, such as distance measures between color vectors (e.g., L2 norms), an indicator of whether a color vector has a mapping applied to it, such as a value of zero to indicate that a color histogram or color vector is raw (e.g., no mapping has been applied to it), and a value of one to indicate that a square root function has been applied to a color histogram or color vector. Matching data 132 can also include a ranking of images based on distance measures between color vectors of the images and a color vector of a query image. In one example, matching data 132 includes a value of a distance threshold used to select a candidate image to be output to a user as an image having a color distribution similar to a color distribution of a query image. For instance, the image search system 104 can require that the distance measure between color vectors of an image and a query image be less than the distance threshold in order for the image to be output as having a similar color distribution as the query image.

Furthermore, image search system 104 may include transceiver module 134. Transceiver module 134 is representative of functionality configured to transmit and receive data using any suitable type and number of communication protocols. For instance, data within image search system 104 can be transmitted to server 114 with transceiver module 134. Furthermore, data can be received from server 114 with transceiver module 134. Transceiver module 134 can also transmit and receive data between computing devices of computing device 102. In one example, transceiver module 134 includes a low power wireless communication standard (e.g., a Bluetooth® protocol) for communicating data between computing devices of computing device 102.

Image search system 104 can also include image search application 136 that represents functionality configured to perform multi-resolution color-based image searches. Image search application 136 may include color histogram module 138, encoder module 140, search module 142, and matching module 144. These modules can work in conjunction with each other to facilitate multi-resolution color-based image searches. These modules can be implemented as any type of module or component in software (e.g., as software instructions that are executable with a processing system), hardware, or combinations thereof, as a standalone application or as a module or component of another device application, and in any type of computing device.

Color histogram module 138 can be implemented to generate color histograms and color vectors of an image, such as by generating a multi-resolution color histogram of an image and a color vector of the image from the multi-resolution color histogram. The histogram 108 in FIG. 1 is a one-dimensional color histogram (e.g., colors are represented in one dimension, such as the color name) that can be generated by color histogram module 138. Color histogram module 138 can also generate a color histogram of an image in which the colors are represented by values in more than one dimension, such as a two-dimensional (2D) or 3D color histogram. For instance, colors can be represented in a multi-dimensional color space, such as in a RGB color space (e.g., colors are represented by red, green, and blue components). In one example, color histogram module 138 generates a 3D color histogram of an image in a LAB color space, sometimes referred to as a CIELAB color space. A LAB color space may include a first dimension that represents luminance (or lightness), a second dimension that represents green-red, and a third dimension that represents blue-yellow. A color in LAB color space can thus be denoted as a three-tuple including a value of L for the lightness, and A and B values for the green-red and blue-yellow color components, respectively. A LAB color space is consistent with human perception, in that an amount of change in one or more of the L, A, or B values generally corresponds to about the same amount of visually perceived change.

For example, FIG. 2 illustrates example color spaces 200 in accordance with one or more aspects of the disclosure. Color spaces 200 includes color space 202 and color space 204. Color space 202 depicts a LAB color space, in which the lightness dimension is represented from L=0 to +L (e.g., L can be in the range of 0 to 255). A smaller value of L denotes less lightness than a larger value of L. The A value for the green-red component ranges from −A to +A (e.g., A can be in the range −256 to 255). Negative values of A indicate amounts of green, and positive values of A indicate amounts of red. The B value for the blue-yellow component ranges from −B to +B (e.g., B can be in the range −256 to 255). Negative values of B indicate amounts of blue, and positive values of B indicate amounts of yellow.

Color space 204 depicts an RGB color space having dimensions corresponding to red, green, and blue color components. To generate a color histogram for an image, color histogram module 138 determines a resolution (e.g., a number of bins) in each component of a color space, and counts the number of pixels of the image that belong to each of the bins. In color space 204, each of the red, green, and blue dimensions has a resolution of six, since each of these dimensions includes six bins. Since the color space 204 is in 3D, each bin corresponds to a 3D shape in the color space 204, such as a cube. For clarity, the bins are shown as spheres in color space 204. The bins may or may not be of equal size along a given dimension, so that a cube representing a bin may or may not have equal-length sides. In one example, the size of the bins along a dimension of a color space are of equal size. The color histogram module 138 can generate a 3D histogram for an image (e.g., a query image) by counting the number of pixels of the image that belong to each of the bins (e.g., cubes) of the color space 204. Hence, the value of each bin of the 3D histogram stores the number of pixels of the image that are represented by color components of the bin. In one example, the color histogram module 138 normalizes a color histogram so that its contents sum to unity, such as by dividing the number of pixels that belong to each of the bins of the color space 204 by the total number of pixels of the image. In the example in FIG. 2, since each dimension of the color space 204 has a resolution of six, the number of bins, which corresponds to the length of a color vector representing the color histogram constructed in the color space 204, is $6^3$=216 bins.

Color histogram module 138 can generate a multi-resolution color histogram by concatenating color histograms having different resolutions (e.g., a first color histogram of a query image and a second color histogram of the query image, the first color histogram and the second color histogram having different resolutions). In one example, color histogram module 138 determines a first color histogram and a second color histogram as respective 3D histograms with different numbers of bins from one another in a LAB color space, such as color space 202. For instance, the first color histogram can include different numbers of bins in each of the dimensions of the LAB color space, such as [9, 7, 8], denoting nine bins in the L dimension, seven bins in the A dimension, and eight bins in the B dimension. The second color histogram can include a same number of bins in each of the dimensions of the LAB color space, such as [10, 10, 10], denoting ten bins in the L dimension, ten bins in the A dimension, and ten bins in the B dimension. Hence, the same number of bins of the second color histogram can be different than the numbers of bins of the first color histogram.

The color histogram module 138 can generate an intermediate color vector that represents the color distribution of the image from the contents of the multi-resolution histogram, which includes contents of the first color histogram and the second color histogram. For instance, the color histogram module 138 can generate an intermediate color vector by placing the data values stored in the bins of the multi-resolution histogram into a vector. For resolutions of [9, 7, 8] and [10, 10, 10] for the first and second color histograms, respectively, as described above, the length of the intermediate color vector is therefore (9×7×8)+(10×10×10)=1504. The color histogram module 138 can generate a color vector from the intermediate color vector by applying a mapping to the intermediate color vector, such as by taking the square root of values of the intermediate color vector to form the color vector. Additionally or alternatively, the color histogram module 138 can generate a color vector from a color histogram by applying a mapping to the color histogram, such as by taking the square root of values of the color histogram, and assigning the resulting values with the square root applied to elements of the color vector.

In one example, the resolutions of the multi-resolution color histogram can be user-specified. For instance, image search system 104 can expose a user interface via the display 120 in which a user can select values for the number of color histograms to include in a multi-resolution histogram, the number of bins in each dimension of each color histogram, and the sizes of the bins. Additionally or alternatively, image search system 104 can determine the number of color histograms to include in a multi-resolution histogram, and the number and sizes of bins in each dimension of each color histogram automatically and without user intervention. For instance, the color histogram module 138 can select default values, such as two color histograms to make up the multi-resolution color histogram, having resolutions [9, 7, 8] and [10, 10, 10]. In one example, the color histogram module 138 sets the number of color histograms to include in a multi-resolution histogram and the number and sizes of bins in each dimension of each color histogram based on the image, such as by determining the frequency content of the image. For instance, the color histogram module 138 may set a size of a first bin to be larger than the size of a second bin when the frequency content spanned by the first bin is more sparse (e.g., includes less energy) than the frequency content spanned by the second bin.

Additionally or alternatively, color histogram module 138 can apply a mapping F(h) to a color histogram h, such as a multi-resolution color histogram, to generate a color vector. Equivalently, color histogram module 138 can apply a mapping to an intermediate color vector constructed from the contents of the color histogram to generate a color vector. By applying a mapping to a color histogram or intermediate color vector constructed from the color histogram, color histogram module 138 can restrict the color histogram and prevent colors that are prevalent in an image from dominating colors that are less prevalent in the image. One mapping used by the color histogram module 138 is a square root function. For instance, the color histogram module 138 can take the square root of values of the color histogram of the image to restrict the color histogram. As an example, by applying a mapping of a square root to the histogram 108 in FIG. 1, $(F(h)=\sqrt{h})$, the contents of the histogram 108 are changed from [0.5, 0.25, 0.25] for blue, red, and yellow, respectively, to [0.7071, 0.5, 0.5]. In this example, the vector [0.5, 0.25, 0.25] is referred to as the intermediate color vector, and the vector resulting from the mapping, [0.7071, 0.5, 0.5], is referred to as the color vector. Hence, by applying the square root mapping, the differences in the histogram between the dominant blue color and the sparse red and yellow colors is decreased (from 0.5-0.25=0.25 to 0.7071-0.5=0.2071). Accordingly, the image search system 104 may be more likely to determine a matching image to the query image that includes the red and yellow colors by applying the square root mapping. In contrast, without applying the square root mapping, a candidate image of the search may be more likely to omit the red or yellow colors, since the blue color may dominate the matching process, swamping out the contributions of the more sparse red and yellow colors.

Figure 3:
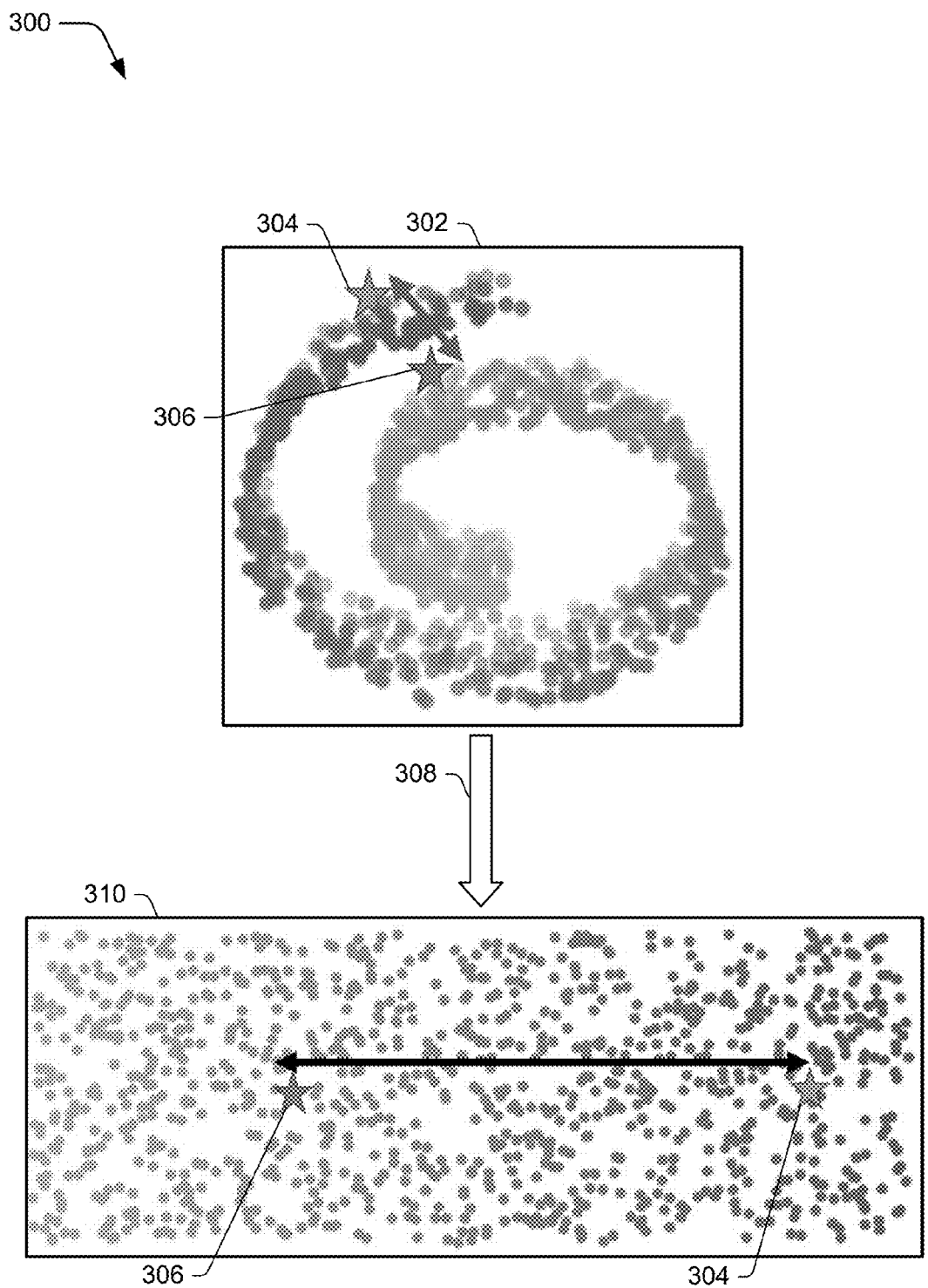
FIG. 3 illustrates example distances between colors in different subspaces in accordance with one or more aspects of the disclosure.

For example, as discussed below in more detail with respect to matching module 144, determining a matching image to a query image (e.g., an image that has a similar color distribution as the query image) can include determining distance measures between the color vector for a query image and the color vectors of candidate images, such as stock images in a database. The distance measures can include an L2-norm. The choice of the mapping F (•) applied to the color histograms can have a significant impact on the distance measures. To demonstrate this, FIG. 3 illustrates generally at 300 example distances between colors in different subspaces in accordance with one or more aspects of the disclosure. Subspace 302 in FIG. 3 includes two colors, denoted by stars at point 304 and point 306. A distance between point 304 and point 306 is denoted by the arrow between these two points, and represents a distance measure between the color of point 304 and the color of point 306 in the subspace 302, such as an L2-norm. Considering solely the point 304 and the point 306 in the subspace 302, the distance measure between these points is relatively small, suggesting a similarity between the colors of the point 304 and the color of the point 306. However, when considering the distribution of colors that the point 304 and the point 306 are drawn from, the relatively small distance measure between these points can be misleading.

For instance, subspace 302 includes the point 304 and the point 306 together with the distribution of colors from which the point 304 and the point 306 are obtained. In subspace 302, the distribution includes a swirl (e.g., spiral) of colors from which the color of point 304 and the color of point 306 are obtained. In light of the distribution of colors, the distance measure indicated by the arrow between the point 304 and the point 306 in subspace 302 may be a poor choice, since it indicates that the color of the point 304 is relatively close to the color of the point 306, despite that within the distribution (e.g., the color swirl), the colors of the point 304 and the point 306 may be far apart.

By applying a mapping indicated by arrow 308 to the colors in the subspace 302 that unravels the spiral distribution, the colors are shown in subspace 310, in which the distance between the point 304 and the point 306 is significantly greater than the distance between these points in the subspace 302. Accordingly, the choice of the mapping can have a significant impact on the distance measure. Generally, a mapping that does not increase the dimensionality of a color histogram may be more desirable than a mapping that does increase the dimensionality of the color histogram, because the increased dimensionality results in higher computational resources needed to compute the distance measures. Hence, in one example, the color histogram module 138 applies a square root mapping function which maintains the size of the color histogram or color vector.

Returning to FIG. 1, a color vector generated by color histogram module 138, along with any suitable information, such as a multi-resolution color histogram formed by concatenating color histograms having different resolutions (e.g., by concatenating a first color histogram of a query image and a second color histogram of the query image, the first color histogram and the second color histogram having different resolutions), a number of color histograms making up a multi-resolution color histogram, sizes of bins, numbers of bins, whether parameters of a multi-resolution color histogram are automatically determined or user-specified, an intermediate color vector, an indicator of whether a mapping is applied to a color histogram or intermediate color vector, and indicator of a type of mapping function applied (e.g., a square root function), combinations thereof, and the like, used by or calculated by color histogram module 138 can be stored in histogram data 126 of storage 124 and made available to modules of image search application 136. In one example, color histogram module 138 provides a color vector of a query image to encoder module 140.

Encoder module 140 can be implemented to compress a color vector to form a compressed color vector having a length less than a length of the color vector. For instance, when a multi-resolution color histogram is constructed by concatenating two color histograms having resolutions [9, 7, 8] and [10, 10, 10], the resulting color vector for the multi-resolution color histogram having a square root mapping applied to it has a length of 1504. To reduce the storage and computational requirements for the color vector, the encoder module 140 can compress the color vector to generate a compressed color vector having a length less than the length of the color vector before the compression.

Encoder module 140 can compress a color vector and generate a compressed color vector in any suitable way. In one example, encoder module 140 compresses a color vector generated by color histogram module 138 by splitting the color vector into a plurality of vectors in a subspace having a dimension less than a dimension of the color vector, assigning the vectors to respective clusters in the subspace, and concatenating identification numbers of the clusters assigned to the vectors into a compressed color vector. For instance, encoder module 140 can include an encoder as illustrated in FIG. 4.

Figure 4:
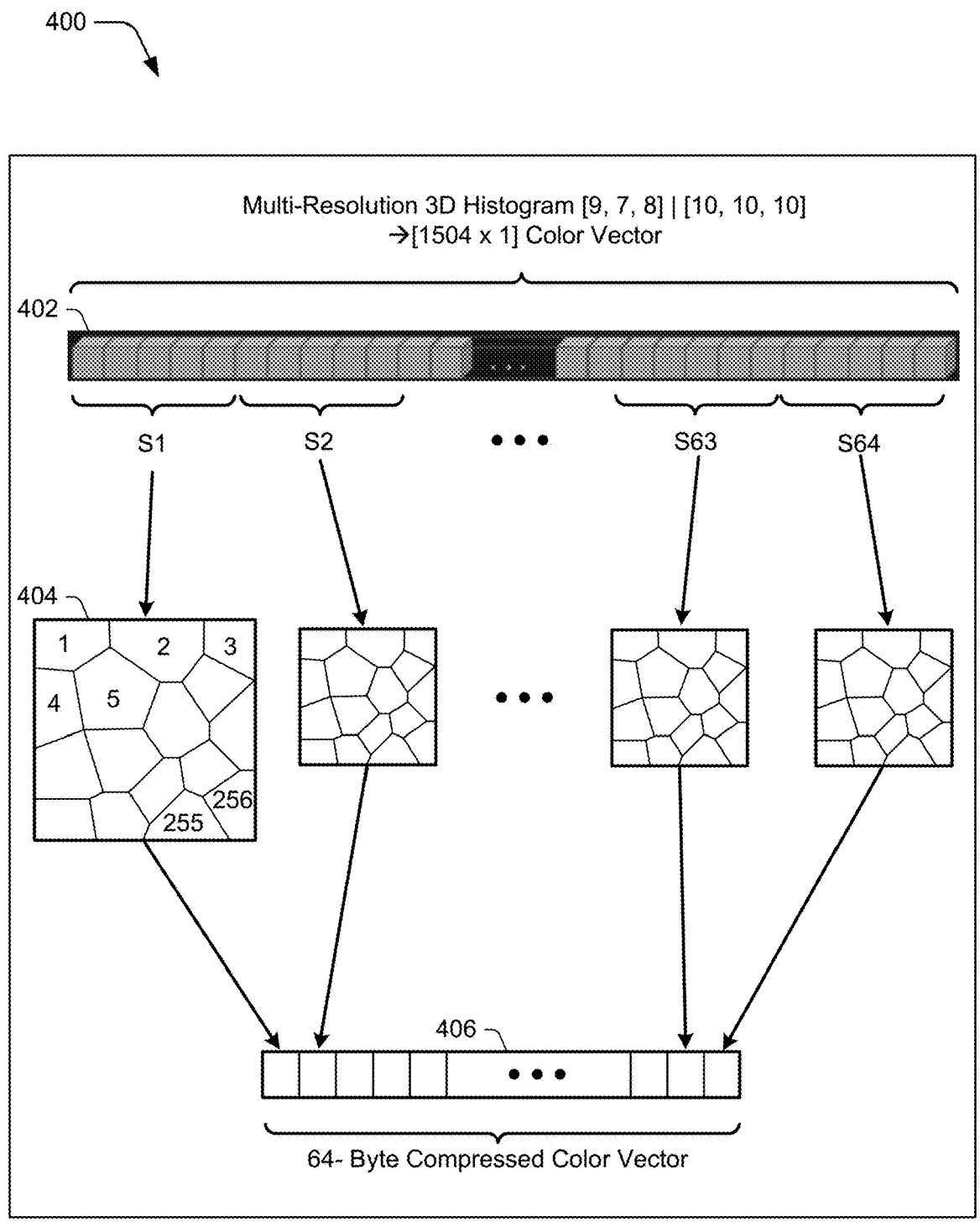
FIG. 4 illustrates an example encoder to compress a color vector in accordance with one or more aspects of the disclosure.

FIG. 4 illustrates an example encoder 400 to compress a color vector in accordance with one or more aspects of the disclosure. Encoder 400 receives a color vector 402, such as a color vector generated by the color histogram module 138 by forming a multi-resolution color histogram and taking the square root of its values, or an intermediate color vector generated by the color histogram module 138 by forming a multi-resolution color histogram without taking the square root of its values. In the example in FIG. 4, the color vector 402 has a length of 1504 and is generated from a multi-resolution 3D histogram formed by concatenating a color histogram of resolution [9, 7, 8] with a color histogram of resolution [10, 10, 10]. For instance, the color histograms can represent colors in a LAB color space.

The encoder 400 can zero pad the color vector 402 by adding zero values to the color vector 402 so that the resulting length is divisible by the size of a subspace (e.g., 24) and the number of vectors (e.g., 64). The encoder 400 can add zeros to any suitable portion of the color vector 402, such as at an end of the color vector 402. The encoder 400 splits the color vector with the additional zeros into a plurality of vectors S1 . . . S64 in the subspace. For instance, the encoder 400 may pad the length—1504 color vector 402 with 32 zeros to a length of 1536 for the subspace of dimension 24, since 1536 is divisible by 24 and 64, so that the color vector 402 is split into 64 vectors of length 24.

The encoder 400 also divides the subspace of dimension 64 into a plurality of non-overlapping clusters, such as 256 clusters, so that each cluster can be represented by a byte. For instance, the subspace 404 is divided into 256 clusters, and each cluster is assigned a cluster number (e.g., 1, 2, . . . 256). To compress the color vector 402, the encoder 400 assigns each vector S1 . . . S64 to one of the clusters in the subspace. For instance, since the clusters completely fill the subspace 404 and do not overlap one another, each of the vectors lies in one and only one of the clusters within the subspace 404. Hence, the encoder 400 denotes each vector with a respective identifier of one of the clusters (e.g., 1, 2, . . . 256) in which the vector is located. The encoder 400 can then concatenate the respective cluster identifiers for the vectors to form a compressed color vector 406, which can be represented by 64 bytes.

Returning again to FIG. 1, a compressed color vector generated by encoder module 140, along with any suitable information, such as a multi-resolution color histogram made up of two or more color histograms, a color vector, a number of vectors split from a color vector into a subspace, identifiers of the vectors (e.g., vector identification numbers), clusters of a subspace, subspace identifiers (e.g., byte numbers), combinations thereof, and the like, used by or calculated by encoder module 140 can be stored in compression data 128 of storage 124 and made available to modules of image search application 136. In one example, encoder module 140 provides a compressed color vector to matching module 144.

Search module 142 can be implemented to obtain images and color vectors of the images. Images can include candidate images that are to be searched to determine if they have a color distribution similar to that of a query image. Search module 142 can obtain images and color vectors in any suitable way and from any suitable source. In one example, search module 142 obtains images and color vectors of the images from a database, such as a database of stock images maintained by server 114. For instance, responsive to image search system 104 receiving a query image, such as query image 106, search module 142 can obtain a plurality of candidate images and color vectors for the candidate images from server 114, such as by sending a request for images and color vectors to server 114 with transceiver module 134. The request can include any suitable data, such as an indicator of whether the color vectors should have a mapping applied to them (e.g., a square root mapping), a size of the color vectors, an indicator of an encoder to be used to compress the color vectors, etc. For instance, the request can include any suitable parameter so that the color vectors obtained by search module 142 are consistent with (e.g., generated in a similar manner) as the color vector or compressed color vector of a query image, allowing the valid determination of a distance measure, such as an L2-norm, between the color vector or compressed color vector of the query image and the color vectors of images obtained by the search module 142.

In one example, search module 142 obtains candidate images and color vectors of the candidate images from computing device 102, such as from images and color vectors maintained in storage 124. For instance, storage 124 can include an image gallery that includes digital images and color vectors for the digital images, such as images from a user's directory of files on computing device 102 or server 114, images from a user's photo gallery (e.g., an online photo sharing service, images stored in a user's image editing application, such as Photoshop®, etc.), images a user has posted in a social media post, blog, online comment, etc., images a user has attached to an email, text, or other communication sent from or received by computing device 102, images provided by a user (e.g., receiving user-supplied images), images captured by a computing device, such as with a camera integrated into computing device 102, and the like.

Additionally or alternatively, search module 142 can obtain images without color vectors, such as from a server (e.g., server 114), and provide the images to color histogram module 138. Color histogram module 138 can generate color vectors for the images, such as by determining multi-resolution 3D color histograms for the images and color vectors from the multi-resolution 3D histograms, as described above. Color histogram module 138 may then provide the color vectors to search module 142 or matching module 144. Hence, color histogram module 138 can generate color vectors for candidate images so that the color vectors are consistent with a color vector or compressed color vector generated for a query image.

Color vectors and images obtained by search module 142, along with any suitable information, such as a source of images (e.g., an identifier of a database), a size of color vectors, an indication of whether a color vector has a mapping applied to it, such as a square root mapping, an indication of an encoder used to compress a color vector, metadata of images, such as a date an image was captured, camera settings used to capture an image (e.g., aperture, shutter speed, light or sensor sensitivity setting, etc.), a name of a photographer who captured an image, an indicator of a type of camera or capture device used to capture an image, a location where an image was captured (e.g., coordinates such as longitude and latitude), combinations thereof, and the like, used by or calculated by search module 142 can be stored in image data 130 of storage 124 and made available to modules of image search application 136. In one example, search module 142 provides color vectors of candidate images to matching module 144.

Matching module 144 can be implemented to generate distance measures between a color vector of a query image and color vectors of candidate images, and select one or more images of the candidate images based on the distance measures as images that have similar color distributions to the color distribution of the query image. Hence, the distance measures indicate color similarity of candidate images to the query image. Matching module 144 can generate any suitable distance measure between color vectors. In one example, matching module 144 determines L2-norms as distance measures between color vectors of color histograms. For instance, let $F(\cdot)$ denote a mapping of a color histogram, and let $h_1$ and $h_2$ denote two color histograms, such as a color histogram generated for a query image by color histogram module 138 and a color histogram of a candidate image obtained by search module 142, respectively. The respective color vectors for the color histograms are represented by the histogram values in a vector form, so that $h_1$ and $h_2$ equivalently denote two color vectors for a query image and a candidate image, respectively. Matching module 144 can therefore determine a distance measure between the two mapped histograms $F(h_1)$ and $F(h_2)$ according to $$L_2(F(h_1), F(h_2)) = \|F(h_1) - F(h_2)\|^2.$$

When a mapping function corresponding to a square root function is used to restrict the histograms as discussed above (e.g., $F(h) = \sqrt{h}$), matching module 144 can thus determine a distance measure between the two mapped histograms $F(h_1)$ and $F(h_2)$ according to $$\begin{aligned} L_2(F(h_1), F(h_2)) &= \|\sqrt{h_1} - \sqrt{h_2}\|^2 \\ &= \sum_{bins} \sqrt{h_1 h_1} + \sum_{bins} \sqrt{h_2 h_2} - 2\sum_{bins} \sqrt{h_1 h_2} \\ &= 2 - 2\sum_{bins} \sqrt{h_1 h_2} \\ &= 2 - 2k(h_1, h_2) \end{aligned}$$

where $\Sigma_{bins} h = 1$ and $k(h_1, h_2) = \Sigma_{bins}\sqrt{h_1 h_2}$ denotes the Hellinger kernel between the original histograms $h_1$ and $h_2$ without the mapping $F(h) = \sqrt{h}$ applied. Hence, by using a mapping function corresponding to a square root, the L2-norm between two mapped histograms can be determined by the Hellinger kernel of the histograms without having to explicitly apply the square root mapping to the color histograms. However, by pre-computing the color vectors of candidate images to be searched from their color histograms with the square root mapping applied, and storing the color vectors together with the candidate images, directly evaluating the L2 norms between color vectors can be more quickly performed than indirectly evaluating the L2 norms by computing the Hellinger kernels of color histograms without the mapping applied. This is because evaluation of the Hellinger kernels can require more processor resources during an online color-based image search than direct evaluation of the L2 norms between a color vector of a query image and color vectors of candidate images.

Matching module 144 can determine distance measures between a color vector of a query image and color vectors of candidate images obtained by search module 142, and rank the candidate images based on the distance measures. For instance, a highest ranking candidate image may correspond to a lowest distance measure, indicating the color distributions of the query image and candidate image are similar. The number of images included in the ranking may be user-specified. As an example, a user may enter a number of images in a user interface exposed on display 120 by image search system 104, such as 101 images, and matching module 144 can return the highest-ranked 101 images from more than 101 images searched by image search system 104.

Additionally or alternatively, matching module 144 can require that the distance measure between the color vector of a candidate image and the color vector of a query image be less than a distance threshold for the candidate image to be included within the ranking Hence, the candidate image may have to satisfy a constraint according to the distance threshold in order for the candidate image to be output as having a similar color distribution as the query image. The distance threshold can be user-specified, such as via a user interface exposed on display 120 by image search system 104.

In one example, if the matching module 144 is not able to determine a prescribed number of images that satisfy the constraint according to the distance threshold, matching module 144 communicates to search module 142 to obtain additional candidate images and color vectors of the candidate images. The matching module 144 may then determine distance measures between the color vector of the query image and color vectors of the additional candidate images to place some of the additional candidate images in the ranking. The matching module 144 and search module 142 may iterate this process over batches of candidate images until the prescribed number of images that satisfy the constraint according to the distance threshold are found. The batch size may be user-specified, such as via a user interface exposed on display 120 by image search system 104 (e.g., a user may specify to obtain 50 candidate images in a batch).

Images determined by matching module 144, along with any suitable information, such as distance measures, L2-norms, Hellinger kernels, a ranking of images, a value of a distance threshold, a number of iterations of searches needed to obtain enough candidate images that satisfy a distance constraint, a batch size of images, statistics of distance measures (e.g., mean, variance, max, min, etc.), combinations thereof, and the like, used by or calculated by matching module 144 can be stored in matching data 132 of storage 124 and made available to modules of image search application 136. In one example, matching module 144 provides images with similar color distributions to the color distribution of a query image to a user interface exposed on display 120 by image search system 104.

Example Image Search System

Figure 5:
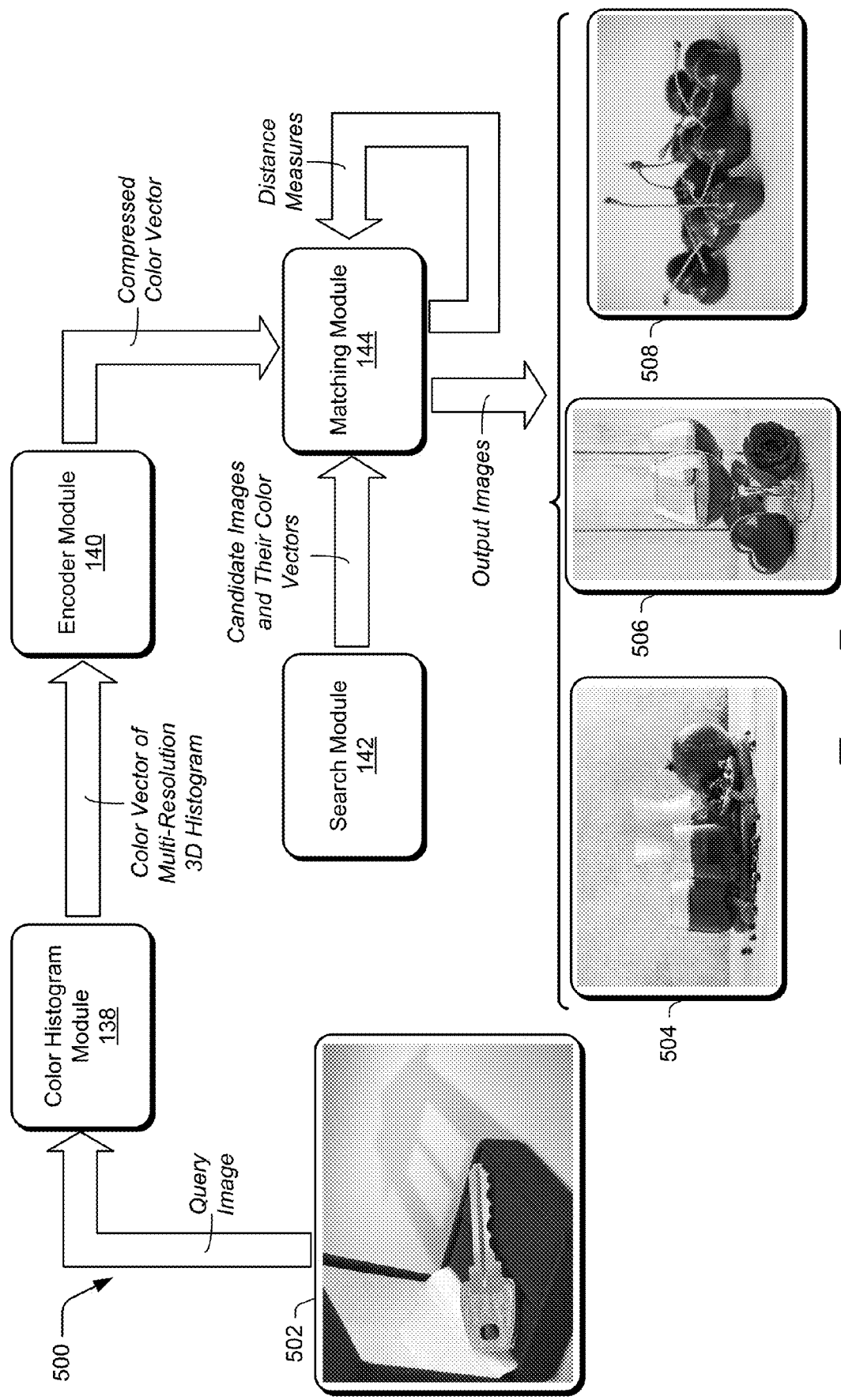
FIG. 5 illustrates an example system usable for multi-resolution color-based image search in accordance with one or more aspects of the disclosure.

FIG. 5 illustrates an example system 500 usable for multi-resolution color-based image search in accordance with one or more aspects of the disclosure. In this implementation, system 500 includes the modules of image search application 136 as described in FIG. 1, e.g., color histogram module 138, encoder module 140, search module 142, and matching module 144. System 500 is one example of image search system 104 that can be constructed using the modules of image search application 136. For instance, signals can be redefined, and modules can be modified, combined, divided, added, or removed to form a modified system, without altering the functionality of system 500. Accordingly, such modified systems are considered to be within the scope of the disclosure.

Furthermore, for simplicity, system 500 is limited to the modules of image search application 136 and a description of some of their interconnects. System 500 can, however, include any suitable signals and communications between modules omitted for simplicity. Such signals may include system clocks, counters, image indicators, sequence indicators (e.g., sequences of vectors, clusters, etc.), reset signals, and the like. In one example, system 500 can operate in real time (e.g., with no perceptible delay to a user). Accordingly, signals can be calculated by the modules of system 500 and communicated between the modules of system 500 without significant delay, so that a user may provide a query image to system 500 and receive output images from system 500 without perceptible delay to a user.

Moreover, system 500 can be implemented on any suitable device or devices. In one example, system 500 is implemented on one computing device (e.g., computing device 102 in FIG. 1). In another example, system 500 is implemented on more than one computing device. For instance, parts of system 500 can be implemented by a first computing device, such as one computing device of computing device 102 in FIG. 1, and other parts of system 500 can be implemented by an additional computing device of computing device 102. In one example, a server implements parts of system 500, such as server 114 in FIG. 1. A server can be remote, e.g., because it is not collocated with the first computing device. A server may be implemented to receive signals of system 500 from a computing device (e.g., computing device 102), process the received signals, such as with image search support system 116, and transmit results of the processing back to the computing device. Hence, image search support system 116 of server 114 in FIG. 1 can include system 500.

Additionally or alternatively, parts of system 500 can be implemented by an additional computing device that is collocated with a first computing device. For instance, one device of computing device 102 can be a first computing device, and another device of computing device 102 can be an additional, collocated computing device. The first computing device and the additional computing device can be operated by one or more users. Hence, system 500 can provide for multiple users within an environment to share data included in system 500.

System 500 can receive query image 502. For instance, query image 502 may be provided by a user to system 500 to conduct a multi-resolution color-based image search to return output images that have similar color distributions as the query image 502. In response to receiving query image 502, system 500 can return output images that have color distributions that are similar to that of query image 502, including output image 504, output image 506, and output image 508. To determine the output images 504-508, color histogram module 138 may obtain query image 502.

Color histogram module 138 can determine a multi-resolution 3D color histogram for the query image 502. In one example, color histogram module 138 determines a first color histogram and a second color histogram in a LAB color space, the first and second color histograms having different resolutions (e.g., different number of bins) in the LAB color space. For instance, the first color histogram may have a resolution of [9, 7, 8] in the LAB color space, and the second color histogram may have a resolution of [10, 10, 10] in the LAB color space. The color histogram module 138 can concatenate the first color histogram and the second color histogram to generate a multi-resolution 3D color histogram of the query image 502. Additionally or alternatively, color histogram module 138 can normalize the multi-resolution 3D color histogram so that its values sum to unity over all the bins of the multi-resolution 3D color histogram.

Color histogram module 138 can apply a mapping to the multi-resolution 3D color histogram and generate a color vector from results of the mapping. In one example, color histogram module 138 applies a mapping that includes a square root function to the multi-resolution 3D color histogram. The color histogram module 138 can form a color vector for the query image 502 from the multi-resolution 3D color histogram, such as by forming a vector from the values of the bins in the multi-resolution 3D color histogram that have been mapped with the square root function. In one example, color histogram module 138 determines a length—1504 color vector for the query image 502. Color histogram module 138 can provide the color vector for the query image 502 to the encoder module 140.

Responsive to receiving the query image 502, system 500 can instruct search module 142 to obtain candidate images and color vectors of the candidate images. For instance, search module 142 can obtain candidate images and their color vectors from a server hosting a database of stock images. Search module 142 can send a request to the server for the candidate images and their color vectors, including details of the parameters of the color vectors, such as a desired length of the color vectors, an encoder to use to compress the color vectors, etc., to ensure that the compressed color vector of query image 502 generated by encoder module 140 is consistent with the color vectors obtained by search module 142 (e.g., so that a valid L2-norm can be computed between the compressed color vector of the query image 502 and the color vectors of the candidate images).

Search module 142 can obtain candidate images and color vectors of the candidate images from more than one source, such as multiple databases of images hosted by multiple servers, a client computing device, and combinations thereof. In one example, search module 142 obtains a prescribed number of candidate images and color vectors of the candidate images, such as a user-designated number of images. For instance, a user may specify to obtain 50 candidate images in a batch of candidate images and color vectors of the candidate images. Search module 142 can provide the candidate images and color vectors of the candidate images to matching module 144.

Encoder module 140 can receive the color vector of the query image 502 from color histogram module 138 and generates a compressed color vector from the color vector. The compressed color vector can have a length that is less than the length of the color vector of the query image 502. Encoder module 140 can generate a compressed color vector in any suitable way. In one example, encoder module 140 includes an encoder that pads the color vector with one or more zeros, and splits the color vector having the one or more zeros into a plurality of vectors in a subspace having a dimension less than a dimension of the color vector having the one or more zeros. The encoder can then divide the subspace into a plurality of clusters, and denote each vector with a respective identifier of one of the clusters based on a location of the vector in the subspace (e.g., in which cluster the vector lies). To generate the compressed color vector, the encoder can concatenate the cluster identifiers assigned to the vectors.

In one example, the encoder module 140 is configured to bypass the encoder and assign the compressed color vector of the query image 502 to be equal to the color vector of the query image 502 generated by the color histogram module 138. In this case, the color vector is not compressed. The encoder module 140 can provide the compressed color vector to matching module 144.

Matching module 144 can receive the candidate images and color vectors of the candidate images from the search module 142, and the compressed color vector for the query image 502 from the encoder module 140. Matching module 144 can determine distance measures between the compressed color vector of the query image 502 and color vectors of the candidate images. The distance measures may indicate color similarity of the candidate images to the query image. In one example, the distance measures include L2 norms between the compressed color vector of the query image 502 and color vectors of the candidate images.

Matching module 144 can rank the candidate images according to the distance measures, so that a highest ranking candidate image has a lowest distance measure with the compressed color vector of the query image 502. In one example, matching module 144 requires that the distance measure between the color vector of the candidate image and the compressed color vector of the query image 502 be less than a distance threshold (e.g., 0.25) in order for the candidate image to be included in the ranking and output to a user.

Matching module 144 can include any suitable number of candidate images in the ranking. For instance, a user may specify a number of candidate images to include in the ranking, and matching module 144 and search module 142 can iterate the process of obtaining candidate images and their color vectors and computing distance measures between the compressed color vector of the query image 502 and the color vectors of the candidate images until the ranking includes the required number of candidate images.

Matching module 144 can return candidate images (e.g., candidate images in the ranking that satisfy the constraint according to the distance threshold), such as by exposing the candidate images in a user interface. Output images 504-508 are examples of candidate images returned by matching module 144 that have similar color distributions as the query image 502. Note that system 500 can determine the output images 504-508 based on the color distributions of the images without regard to the content of the images. For instance, query image 502 depicts a key, and output images 504-508 do not depict a key, but instead depict objects other than a key, such as food and a glass of wine. Despite including different objects than the query image 502, the output images 504-508 have similar color distributions as the query image 502.

The systems described herein constitute an improvement over conventional systems that perform color-based image search by extracting a subset of dominant colors from a query image and thus lack the required level of detail to adequately capture the color distribution of the query image, or by recoloring candidate images to match the colors of a query image and thus require significant processing resources and induce significant processing delay. Instead, the systems described herein determine a color vector for a query image based on a multi-resolution color histogram of the query image, such as a multi-resolution 3D histogram in a LAB color space, so that the color vector adequately captures the color distribution of the query image at a high level of detail. To prevent dominant colors of the query image from dominating less prevalent colors when forming the color vector, the systems described herein can apply a square root mapping that preserves the less prevalent colors without increasing the size of the color vector.

Moreover, to reduce storage and computational requirements for the color vector, the systems described herein can compress the color vector, such as by reducing a length of the color vector with an encoder. To determine candidate images in a search that have a similar color distribution as the query image, the systems described herein can compute distance measures between the color vector of the query image and color vectors of the candidate images, such as L2-norms between color vectors. The systems described herein can then determine candidate images that have similar color distributions as the query image based on the distance measures. Notably, the systems described herein may not rely on neural networks that are costly to train and require large resources to implement, but instead be implemented with easy-to-implement deterministic methods, such as by computing L2-norms. Accordingly, the systems described herein are efficient and suitable for color-based image searches of large numbers of images in which images are to be quickly found that accurately include the colors of a query image without introducing colors that are not found in the query image.

Example Images

Figure 6:
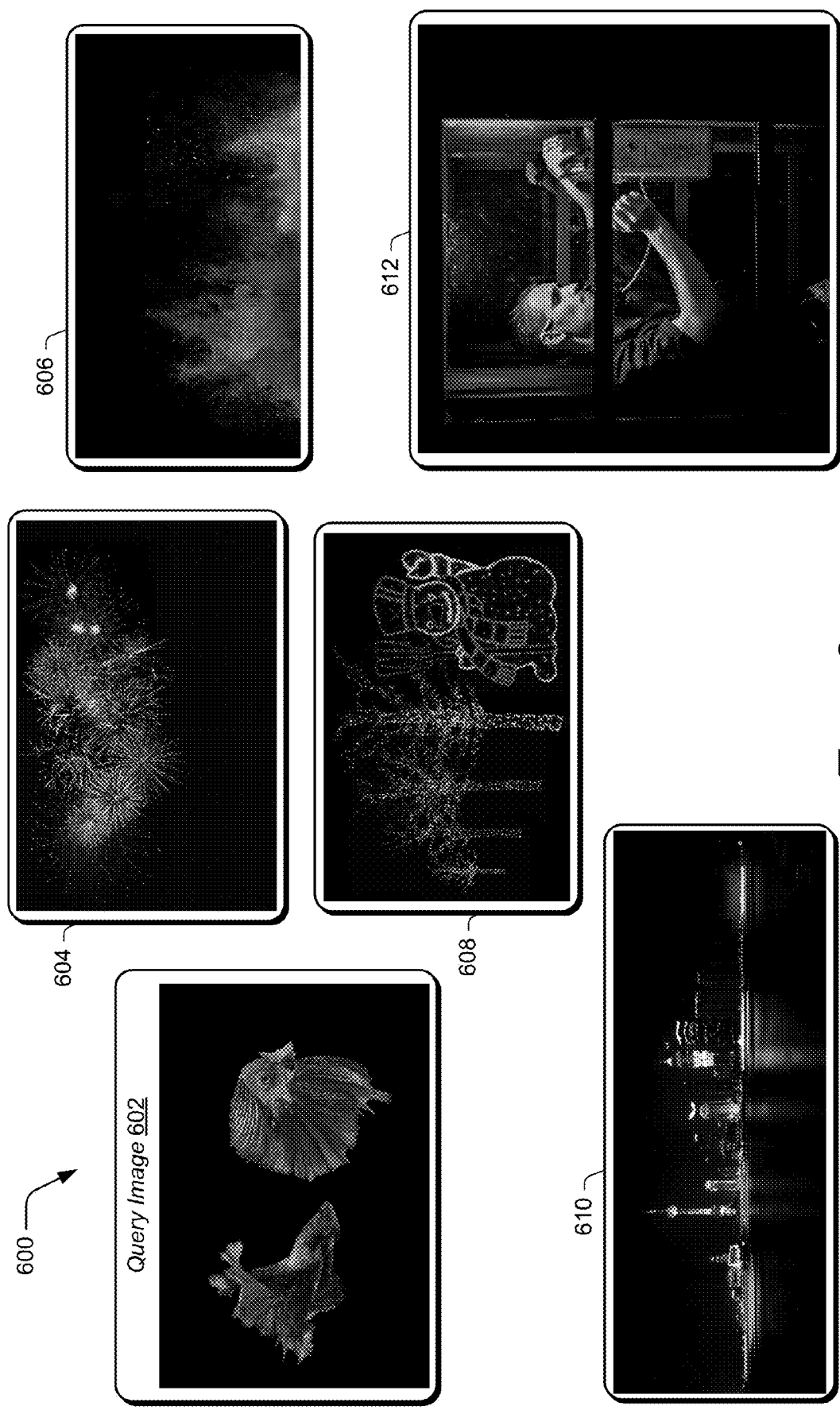
FIG. 6 illustrates example images in accordance with one or more aspects of the disclosure.

FIG. 6 illustrates example images 600 in accordance with one or more aspects of the disclosure. Images 600 include query image 602, and output images 604-612. Query image 602 is an example of a query image provided as input for a color-based image search to one or more of the image search systems described herein, such as image search system 104 in FIG. 1 or system 500 in FIG. 5, and output images 604-612 are examples of images returned by one or more of the systems described herein that have color distributions similar to the color distribution of query image 602.

Query image 602 depicts an image of fish, and includes an array of colors. Output images 604-612 represent output images returned by the image search system. The color distributions of the output images 604-612 match the color distribution of the query image 602. For instance, the output images 604-612 include the array of colors that are included in the query image 602. Moreover, the output images 604-612 do not include colors that are not included in the query image 602. For instance, the output images 604-612 do not introduce new colors not included in the query image 602. Hence, output images 604-612 are suitable for color-based images searches in which images are to be found to fit a color theme, or design or branding guideline.

In one example, the content of the output images 604-612 is not constrained by the content of the query image 602. For instance, the image search system can determine the output images 604-612 without knowledge of the objects that are depicted in the output images 604-612. Instead, the output images 604-612 can be determined based on the color distribution of the images. Accordingly, the output images 604-612 include images that do not include fish, as does query image 602. For instance, output images 604-612 include images of people, landscapes, fireworks, etc.

Additionally or alternatively, the image search system can include an object detector to identify objects in images, and determine candidate images that include a same or similar object as the query image. Hence, the image search system can give a higher priority to candidate images in the ranking that both match the color distribution of the query image 602 and also include a same or similar object as the query image than to candidate images that match the color distribution of the query image 602 but do not include a same or similar object as the query image 602. For instance, an output image that includes fish may be given a higher ranking than another output image that depicts a person without depicting a fish.

Example Procedures

FIG. 7 illustrates an example procedure 700 for multi-resolution color-based image search in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 114 of FIG. 1 that makes use of an image search system, such as system 500 or image search system 104. An image search system implementing procedure 700 may be an independent application that has been installed on the computing device, a service hosted by a service provider that is accessible by the computing device, a plug-in module to the computing device, or combinations thereof.

A first color histogram of a query image is determined (block 702). Color histogram module 138 can determine the first color histogram of a query image. The first color histogram has a first resolution. A second color histogram of the query image is determined (block 704). Color histogram module 138 can determine the second color histogram of the query image. The second color histogram can have a second resolution different than the first resolution.

In one example, determining the first color histogram includes determining the first color histogram as a first three-dimensional histogram in a LAB color space, and determining the second color histogram includes determining the second color histogram as a second three-dimensional histogram in the LAB color space. Additionally or alternatively, determining the first color histogram can include setting the first resolution to include different respective resolutions in each of the dimensions of the LAB color space, such as [9, 7, 8] (e.g., 9 bins in the L dimension, 7 bins in the A dimension, and 8 bins in the B dimension). Determining the second color histogram can include setting the second resolution to include a same resolution in each of the dimensions of the LAB color space, such as [10, 10, 10] (e.g., ten bins in each of the L, A, and B dimensions). Hence, the same resolution of the second color histogram can represent a different number of histogram bins (e.g., 10) than the numbers of histogram bins represented by the resolutions of the first color histogram (e.g., 9, 7, and 8).

A color vector of the query image is generated by concatenating the first color histogram and the second color histogram (block 706). Color histogram module 138 can generate the color vector of the query image by concatenating the first color histogram and the second color histogram.

Hence, the color vector can represent a multi-resolution color histogram. Generating the color vector can include taking square roots of a result of concatenating the first color histogram and the second color histogram.

In one example, generating the color vector includes compressing a result of taking the square roots to reduce a length of the result. Encoder module 140 can be configured to pad the result of taking the square roots with one or more zeros. Additionally or alternatively, encoder module 140 can be configured to split the result of taking square roots into a plurality of vectors in a subspace, and divide the subspace into a plurality of clusters, such as 256 clusters that span the subspace and do not overlap one another. The encoder module 140 can denote each vector of the plurality of vectors with a respective identifier of one of the plurality of clusters, and concatenate the respective identifier for each vector to generate the color vector (e.g., a compressed color vector).

One or more images from a plurality of images is selected based on distance measures between the color vector of the query image and color vectors of the plurality of images (block 708). Matching module 144 can generate the distance measures between the color vector of the query image and color vectors of the plurality of images, and select one or more images from a plurality of images based on the distance measures. The matching module 144 can utilize the distance measures as indication of color similarity of the one or more images to the query image. Selecting the one or more images can include determining the distance measures as L2-norms between the color vector of the query image and the color vectors of the plurality of images.

FIG. 8 illustrates an example procedure 800 for multi-resolution color-based image search in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 114 of FIG. 1 that makes use of an image search system, such as system 500 or image search system 104. An image search system implementing procedure 800 may be an independent application that has been installed on the computing device, a service hosted by a service provider that is accessible by the computing device, a plug-in module to the computing device, or combinations thereof.

A first color histogram and a second color histogram of a query image are determined (block 802). Color histogram module 138 can determine a first color histogram and a second color histogram of a query image. The first color histogram can have a first resolution and the second color histogram can have a second resolution different than the first resolution.

A multi-resolution color histogram of the query image is generated by concatenating the first color histogram and the second color histogram (block 804). Color histogram module 138 can generate a multi-resolution color histogram of the query image is generated by concatenating the first color histogram and the second color histogram.

A color vector of the query image is generated by taking square roots of values of the multi-resolution color histogram (block 806). Color histogram module 138 can generate a color vector of the query image by taking square roots of values of the multi-resolution color histogram.

In one example, the color histogram module 138 is configured to determine the first color histogram and the second color histogram as respective three-dimensional histograms in a LAB color space. The color histogram module 138 can be configured to set the first resolution to include different respective resolutions in each of the dimensions of the LAB color space, and set the second resolution to include a same resolution in each of the dimensions of the LAB color space. The color histogram module 138 can be implemented to set the same resolution different from the different respective resolutions. For instance, the first resolution may be set to [9, 7, 8] and the second resolution may be set to [10, 10, 10]. Hence, the same resolution of the second color histogram can represent a different number of histogram bins (e.g., 10) than the numbers of histogram bins represented by the resolutions of the first color histogram (e.g., 9, 7, and 8).

The color vector is compressed to form a compressed color vector having a length less than a length of the color vector (block 808). Encoder module 140 can compress the color vector to form a compressed color vector having a length less than a length of the color vector. The encoder module 140 can be implemented to pad the color vector with one or more zeros, such as by adding the zeros to the end of the color vector, and split the color vector having the one or more zeros into a plurality of vectors in a subspace having a dimension less than a dimension of the color vector having the one or more zeros. The encoder module 140 can be implemented to divide the subspace into a plurality of clusters, and denote each vector of the plurality of vectors with a respective identifier of one of the plurality of clusters. The identifiers of the clusters may be respective byte values. The encoder module 140 can concatenate the respective identifier for each vector to form the compressed color vector. In one example, the encoder module 140 is configured to take square roots of values of the color vector prior to compressing the color vector.

Distance measures between the compressed color vector of the query image and color vectors of a plurality of images are generated (block 810). Matching module 144 can generate distance measures between the compressed color vector of the query image and color vectors of a plurality of images. Search module 142 can be configured to obtain the color vectors of images as well as the images, such as from a server that maintains a database of stock images. Additionally or alternatively, search module 142 can obtain the color vectors from color histogram module 138, which can be implemented to generate color vectors of candidate images. The distance measures can indicate color similarity of the one or more images to the query image. The matching module 144 can be configured to generate the distance measures as L2-norms between the compressed color vector of the query image and the color vectors of the plurality of images.

One or more images from the plurality of images are selected based on the distance measures (block 812). Matching module 144 can select one or more images from the plurality of images based on the distance measures that indicate color similarity of the one or more images to the query image. Matching module can be configured to select the images as including no colors that are not included in the query image. Additionally or alternatively, matching module 144 can rank the selected images according to the distance measures, such as by placing the images in an ordered list according to the distance measures, so that an image with a lowest distance measure may have a highest position in the ordered list. Matching module 144 can provide the ordered list to a user interface, which exposes the images in an order according to the ranking. For instance, a highest-ranking image may be exposed in a more visible position of the user interface than a lower-ranking image. Additionally or alternatively, the size of images exposed in the user interface may be based on the ranking determined by matching module 144. For instance, higher-ranking images may be displayed as larger in the user interface than lower-ranking images (e.g., with a higher resolution (number of pixels), a larger display area, etc.).

Figure 9:
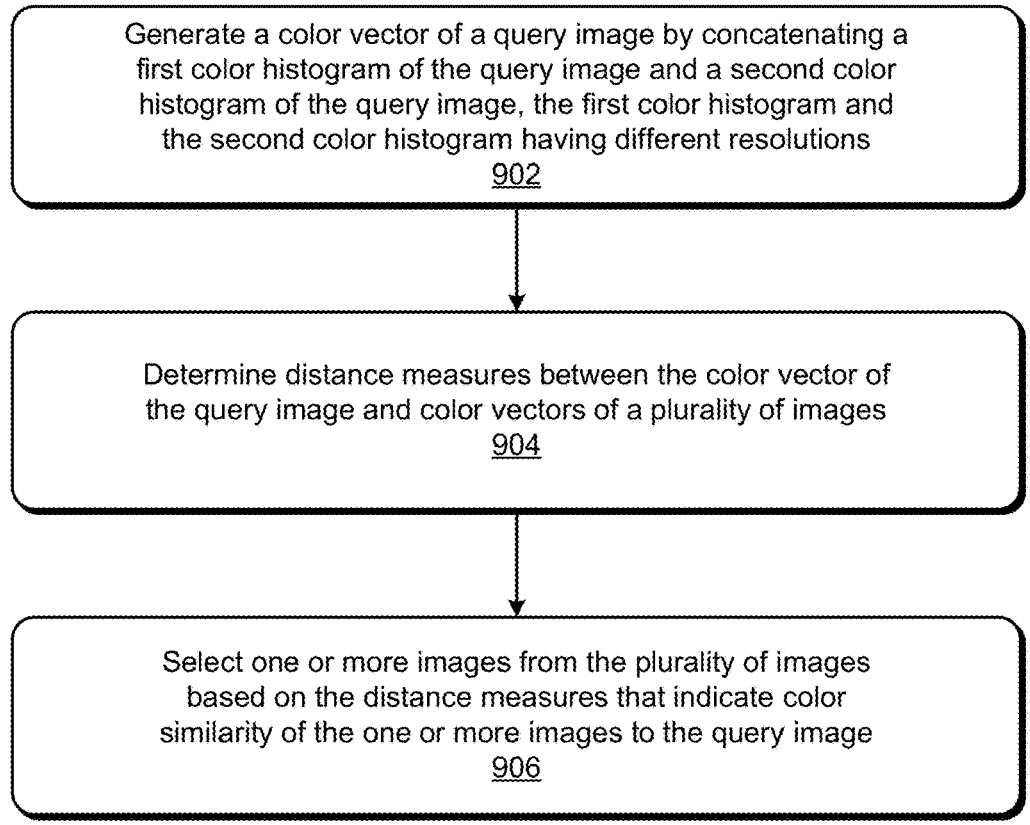
FIG. 9 illustrates a flow diagram depicting an example procedure in accordance with one or more aspects of the disclosure.

FIG. 9 illustrates an example procedure 900 for multi-resolution color-based image search in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 114 of FIG. 1 that makes use of an image search system, such as system 500 or image search system 104. An image search system implementing procedure 900 may be an independent application that has been installed on the computing device, a service hosted by a service provider that is accessible by the computing device, a plug-in module to the computing device, or combinations thereof.

A color vector of a query image is generated by concatenating a first color histogram of the query image and a second color histogram of the query image (block 902). Color histogram module 138 can generate a color vector of a query image by concatenating a first color histogram of the query image and a second color histogram of the query image. The first color histogram and the second color histogram can have different resolutions from one another. Hence, color histogram module 138 can generate a color vector of a query image based on a multi-resolution color histogram.

Distance measures between the color vector of the query image and color vectors of a plurality of images are determined (block 904). Matching module 144 can determine distance measures between the color vector of the query image and color vectors of a plurality of images. The distance measures can indicate color similarity of the one or more images to the query image.

One or more images from the plurality of images are selected based on the distance measures (block 906). Matching module 144 can select one or more images from the plurality of images based on the distance measures that indicate color similarity of the one or more images to the query image.

In one example, encoder module 140 is configured to compress the color vector to reduce a length of the color vector and form a compressed color vector. Matching module 144 can be implemented to determine the distance measures including taking a square root of the color vector prior to compressing the color vector. The distance measures can include L2-norms between the compressed color vector and the color vectors of the plurality of images.

The procedures described herein constitute an improvement over conventional procedures that perform color-based image search by extracting a subset of dominant colors from a query image and thus lack the required level of detail to adequately capture the color distribution of the query image, or by recoloring candidate images to match the colors of a query image and thus require significant processing resources and include significant processing delay. Instead, the procedures described herein determine a color vector for a query image based on a multi-resolution color histogram of the query image, such as a multi-resolution 3D histogram in a LAB color space, so that the color vector adequately captures the color distribution of the query image at a high level of detail. To prevent dominant colors of the query image from dominating less prevalent colors when forming the color vector, the procedures described herein can apply a square root mapping that preserves the less prevalent colors without increasing the size of the color vector.

Moreover, to reduce storage and computational requirements for the color vector, the procedures described herein can compress the color vector, such as by reducing a length of the color vector with an encoder. To determine candidate images in a search that have a similar color distribution as the query image, the procedures described herein can compute distance measures between the color vector of the query image and color vectors of the candidate images, such as L2-norms between color vectors. The procedures described herein can then determine candidate images that have similar color distributions as the query image based on the distance measures. Notably, the procedures described herein may not rely on neural networks that are costly to train and require large resources to implement, but instead can be implemented with easy-to-implement deterministic methods, such as by computing L2-norms. Accordingly, the procedures described herein are efficient and suitable for color-based image searches of large numbers of images in which images are to be quickly found that accurately include the colors of a query image without introducing colors that are not found in the query image.

Example Systems and Devices

Figure 10:
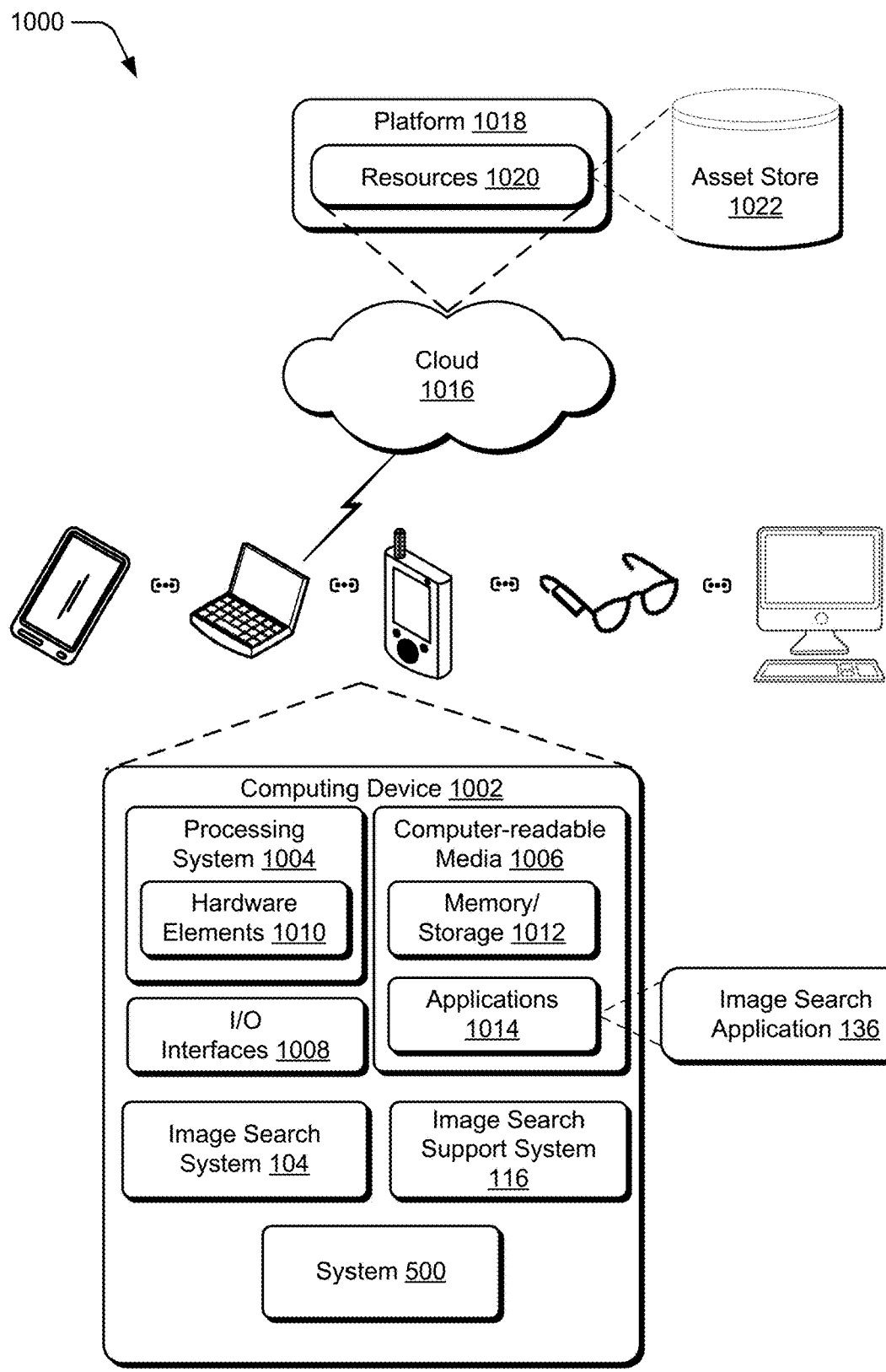
FIG. 10 illustrates an example system including various components of an example device that can be implemented as any type of computing device as described and/or utilized with reference to FIGS. 1-9 to implement aspects of the techniques described herein.

FIG. 10 illustrates an example system 1000 including an example computing device 1002 that is representative of one or more computing systems and devices that can be utilized to implement the various techniques described herein. This is illustrated through inclusion of image search system 104, system 500, image search application 136, and image search support system 116, which operate as described above. Computing device 1002 can be, for example, a user computing device (e.g., computing device 102), or a server device of a service provider, (e.g., server 114). Furthermore, computing device 1002 can include an on-chip system, multiple computing devices, combinations thereof, or any other suitable computing device or computing system. Accordingly, FIG. 10 illustrates computing device 1002 as one or more of a tablet, a laptop computer, a smart phone, smart eye glasses, and a desktop computer, though these examples are illustrative and in no way are meant to limit the type or number of devices that can be represented by computing device 1002.

The example computing device 1002 can include a processing system 1004, one or more computer-readable media 1006, and one or more I/O interfaces 1008 that are communicatively coupled to each other. Although not shown, computing device 1002 can further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1004 is representative of functionality to perform one or more operations using hardware. Accordingly, processing system 1004 is illustrated as including hardware elements 1010 that can be configured as processors, functional blocks, and so forth. This may include implementation in hardware as an application specific integrated circuit or other logic device formed using one or more semiconductors. Hardware elements 1010 are not limited by the materials from which they are formed or the processing mechanisms employed therein. For example, processors can be comprised of semiconductor(s) and transistors (e.g., electronic integrated circuits (ICs)). In such a context, processor-executable instructions may be electronically-executable instructions. Processors 122 in FIG. 1 are an example of processing system 1004.

Computer-readable storage media 1006 is illustrated as including memory/storage 1012. Storage 124 in FIG. 1 is an example of memory/storage of memory/storage 1012. Memory/storage 1012 can include volatile media (such as random access memory (RAM)), nonvolatile media (such as read only memory (ROM), flash memory, optical disks, magnetic disks, and so forth), or combinations thereof. Memory/storage 1012 can include fixed media (e.g., RAM, ROM, a fixed hard drive, and so on) as well as removable media (e.g., flash memory, a removable hard drive, an optical disc, and so forth). Computer-readable media 1006 can be configured in a variety of other ways as further described below.

Input/output interfaces 1008 are representative of functionality to allow a user to enter commands and information to computing device 1002, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Accordingly, input/output interfaces 1008 can include a touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, computing device 1002 can be configured in a variety of ways as further described below to support user interaction.

Computing device 1002 may also include applications 1014. Applications 1014 are representative of any suitable applications capable of running on computing device 1002, and can include a web browser which is operable to access various kinds of web-based resources (e.g., images, videos, assets, media clips, images, content, configuration files, services, user profiles, and the like). Applications 1014 include image search application 136, as previously described. Furthermore, applications 1014 may include any applications supporting image search system 104, system 500, and image search support system 116.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1002. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media can include hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1010, or combinations thereof. Computing device 1002 may be configured to implement particular instructions and functions corresponding to the software and hardware modules. Accordingly, implementation of a module that is executable by computing device 1002 as software may be achieved at least partially in hardware, e.g., through use of computer-readable storage media and hardware elements 1010 of processing system 1004. The instructions and functions may be executable/operable by one or more articles of manufacture (for example, one or more computing devices such as computing device 1002 or processing systems such as processing system 1004) to implement techniques, modules, and examples described herein.

The techniques described herein may be supported by various configurations of computing device 1002 and are not limited to the specific examples of the techniques described herein. This functionality may also be implemented all or in part through use of a distributed system, such as over a "cloud" 1016 via a platform 1018. Cloud 1016 includes and is representative of a platform 1018 for resources 1020. Platform 1018 can abstract underlying functionality of hardware (e.g., servers) and software resources of cloud 1016. Resources 1020 may include applications, data, or applications and data that can be utilized while computer processing is executed on servers that are remote from computing device 1002. Resources 1020 can also include services provided over the Internet, through a subscriber network, such as a cellular or Wi-Fi network, or combinations thereof. Resources 1020 can include asset store 1022, which stores assets, such as videos, images, photographs (e.g., user images in a gallery, a database of stock photographs, and the like), document templates, user profile data, user image libraries, photographs posted in a shared photo service, animation sequences, digital images, metadata of assets, and the like, and may be accessed by computing device 1002.

Generally, resources 1020 may be licensed, purchased, or may be made freely available, (e.g., without authentication, license, or account-based access). The resources 1020 can include any suitable combination of services and content, such as a color-based image search service, a video-editing service, an on-line shopping service, an image editing service, an artwork drawing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets as described above, including digital images and color vectors for the digital images.

Platform 1018 may abstract resources and functions to connect computing device 1002 with other computing devices. Platform 1018 may also serve to abstract scaling of resources to provide a corresponding level of scale to encountered demand for resources 1020 that are implemented via platform 1018. Accordingly, in an interconnected device embodiment, implementation of functionality described herein may be distributed throughout system 1000. For example, the functionality may be implemented in part on computing device 1002 as well as via platform 1018 that abstracts the functionality of cloud 1016.

CONCLUSION

In one or more implementations, a digital medium environment includes at least one computing device. Systems, devices, and techniques are described herein for multi-resolution color-based image search. An image search system can determine a color vector for a query image based on a 3D multi-resolution color histogram of the query image in a LAB color space. The image search system can apply a mapping to the multi-resolution color histogram without increasing the dimensionality of the multi-resolution histogram, such as by taking the square root of the elements of the multi-resolution histogram to add more weight to colors that sparsely occur in the query image. The image search system may include an encoder to compress the color vector, such as by reducing a length of the color vector to reduce storage and computational requirements for the color vector. To determine images that have a similar color distribution as the query image, the image search system can compute distance measures between the color vector of the query image and color vectors of candidate images in a search, such as stock images in a database that stores color vectors together with the stock images. The distance measures can include an L2-norm between color vectors. The image search system can select one or more images to return that have a similar color distribution as the query image based on the distance measures, such as by selecting a number of the images corresponding to the lowest distance measures. Accordingly, the image search system is efficient and suitable for color-based image searches of large numbers of images in which images are to be quickly found that accurately include the colors of a query image without introducing colors that are not found in the query image.

Although implementations of multi-resolution color-based image search have been described in language specific to features and/or methods, the appended claims are not necessarily limited to the specific features or methods described. Rather, the specific features and methods are disclosed as example implementations of multi-resolution color-based image search, and other equivalent features and methods are intended to be within the scope of the appended claims. Further, various different examples are described and it is to be appreciated that each described example can be implemented independently or in connection with one or more other described examples.

What is claimed is:

1. In a digital medium environment for color-based image searching, a method implemented by a processing device, the method comprising:
   determining a color histogram of a query image;
   determining a multi-resolution color histogram of the query image based in part on the color histogram, the multi-resolution color histogram representing color distribution of the query image;
   generating a color vector of the query image by taking square roots of color designations in the multi-resolution color histogram, the generating the color vector including padding a result of the taking the square roots with one or more zeros and compressing the result of the taking the square roots; and
   selecting one or more images from searched images based on distance measures between the color vector of the query image and respective color vectors of the searched images, the selected one or more images having only colors that are included in the query image.

2. The method of claim 1, further comprising:
generating the color vector of the query image by applying a mapping to the multi-resolution color histogram.

3. The method of claim 1, wherein:
the determining the color histogram as a first three-dimensional histogram in a LAB color space; and
the determining the multi-resolution color histogram as a second three-dimensional histogram in the LAB color space.

4. The method of claim 3, wherein:
the color histogram includes different respective resolutions in each dimensions of the LAB color space; and
the multi-resolution color histogram includes a same resolution in each of the dimensions of the LAB color space.

5. The method of claim 1, wherein the generating the color vector includes the compressing the result of the taking the square roots to reduce a length of the result.

6. The method of claim 5, wherein the compressing includes:
splitting the result of the taking the square roots into multiple vectors in a subspace;
dividing the subspace into clusters;
denoting each vector of the multiple vectors with a respective identifier of one of the clusters; and
concatenating the respective identifier for each vector to generate the color vector.

7. The method of claim 5, wherein the generating the color vector includes the padding the result of the taking the square roots with the one or more zeros prior to the compressing.

8. The method of claim 1, wherein the selecting the one or more images includes determining the distance measures as L2-norms between the color vector of the query image and the respective color vectors of the searched images.

9. An image search system for color-based image searching implemented by a processing device in a digital medium environment, the image search system comprising:
a color histogram module to determine a color histogram of a query image, and generate a multi-resolution color histogram of the query image based at least in part on the color histogram;
a matching module to:
determine distance measures between a color vector of the query image and respective color vectors of searched images; and
select one or more images from the searched images having only colors that are included in the query image and the one or more images including no colors that are not included in the query image as determined based on the distance measures that indicate color similarity of the one or more images to the query image.

10. The image search system of claim 9, wherein the color histogram module is configured to generate the color vector of the query image by applying a mapping to the multi-resolution color histogram.

11. The image search system of claim 10, further comprising an encoder module to compress the color vector to form a compressed color vector that has a length less than a length of the color vector.

12. The image search system of claim 9, wherein the color histogram module is configured to determine the color histogram and the multi-resolution color histogram as respective three-dimensional histograms in a LAB color space.

13. The image search system of claim 12, wherein the color histogram includes different respective resolutions in each dimensions of the LAB color space, and set the multi-resolution color histogram includes a same resolution in each of the dimensions of the LAB color space.

14. The image search system of claim 9, further comprising an encoder module to:
pad the color vector of the query vector with one or more zeros;
split the padded color vector into multiple vectors in a subspace that has a dimension less than a dimension of the padded color vector;
divide the subspace into clusters;
denote each vector of the multiple vectors with a respective identifier of one of the clusters; and
concatenate the respective identifier for each vector to form a compressed color vector that has a length less than a length of the color vector.

15. The image search system of claim 14, wherein the matching module is configured to generate the distance measures as L2-norms between the compressed color vector of the query image and the respective color vectors of the searched images.

16. One or more non-transitory computer-readable media storing a plurality of executable instructions, which when executed by a processing device, cause the processing device to perform operations comprising:
determining a multi-resolution color histogram of a query image, the multi-resolution color histogram representing color distribution of the query image;
generating a color vector of the query image by taking square roots of color designations in the multi-resolution color histogram of the query image, and padding a result of the taking the square roots with one or more zeros;
generating a compressed color vector of the query image by compressing the color vector to reduce a length of the color vector;
determining distance measures as L2-norms between the compressed color vector of the query image and respective color vectors of searched images; and
selecting one or more images from the searched images based on the distance measures that indicate color similarity of the one or more images to the query image.

17. The one or more non-transitory computer-readable media of claim 16, wherein the padding the result of the taking the square roots with the one or more zeros is prior to the compressing the color vector.

18. The one or more non-transitory computer-readable media of claim 17, wherein the selected one or more images have only colors that are included in the query image.

19. The one or more non-transitory computer-readable media of claim 16, wherein the selected one or more images include no colors that are not included in the query image.

20. The one or more non-transitory computer-readable media of claim 16, wherein the determining the multi-resolution color histogram as a three-dimensional histogram in LAB color space.

* * * * *